US 6,757,788 B2

(12) United States Patent
Kawamoto et al.

(10) Patent No.: US 6,757,788 B2
(45) Date of Patent: Jun. 29, 2004

(54) CACHE COHERENT CONTROL SYSTEM FOR NETWORK NODES ALLOWS CPU OR I/O DEVICE TO ACCESS TARGET BLOCK WITHOUT CACHE COHERENCE CONTROL, IF ASSOCIATED NODE HAS ACCESS RIGHT IN AN ACCESS RIGHT MEMORY TO TARGET BLOCK

(75) Inventors: Shinichi Kawamoto, Hachioji (JP); Tatsuo Higuchi, Fuchu (JP); Hiromitsu Maeda, Yokohama (JP); Naoki Hamanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 476 days.

(21) Appl. No.: 09/941,834

(22) Filed: Aug. 30, 2001

(65) Prior Publication Data

US 2002/0083275 A1 Jun. 27, 2002

(30) Foreign Application Priority Data

Dec. 25, 2000 (JP) ........................................ 2000-391932

(51) Int. Cl.[7] .............................................. G06F 13/00
(52) U.S. Cl. ........................ 711/145; 711/141; 711/158; 711/151; 711/144; 709/225
(58) Field of Search ................................ 711/141, 144, 711/145, 158, 156, 154, 119, 151; 709/225, 223

(56) References Cited

U.S. PATENT DOCUMENTS

| 6,119,150 A | * | 9/2000 | Fujii et al. ................... 709/213 |
| 6,122,712 A | * | 9/2000 | Torii ........................... 711/141 |
| 6,516,391 B1 | * | 2/2003 | Tsushima et al. ............ 711/146 |
| 2003/0095557 A1 | * | 5/2003 | Keller et al. ................. 370/412 |
| 2003/0163648 A1 | * | 8/2003 | Smith .......................... 711/145 |

* cited by examiner

Primary Examiner—Hong Kim
(74) Attorney, Agent, or Firm—Antonelli, Terry, Stout & Kraus, LLP

(57) ABSTRACT

A cache coherence control system for a multi CPU system having a plurality of CPU nodes, memory nodes and I/O nodes interconnected by a network. Each CPU node control circuit has an access right memory for managing an access right of the node in the unit of an extended node larger than a block size of the internal cache of a CPU. When a memory access is performed, the access right memory is referred to, and if the node has an access right to the extended block including a target block, the block is accessed without cache coherence control at other nodes.

27 Claims, 8 Drawing Sheets

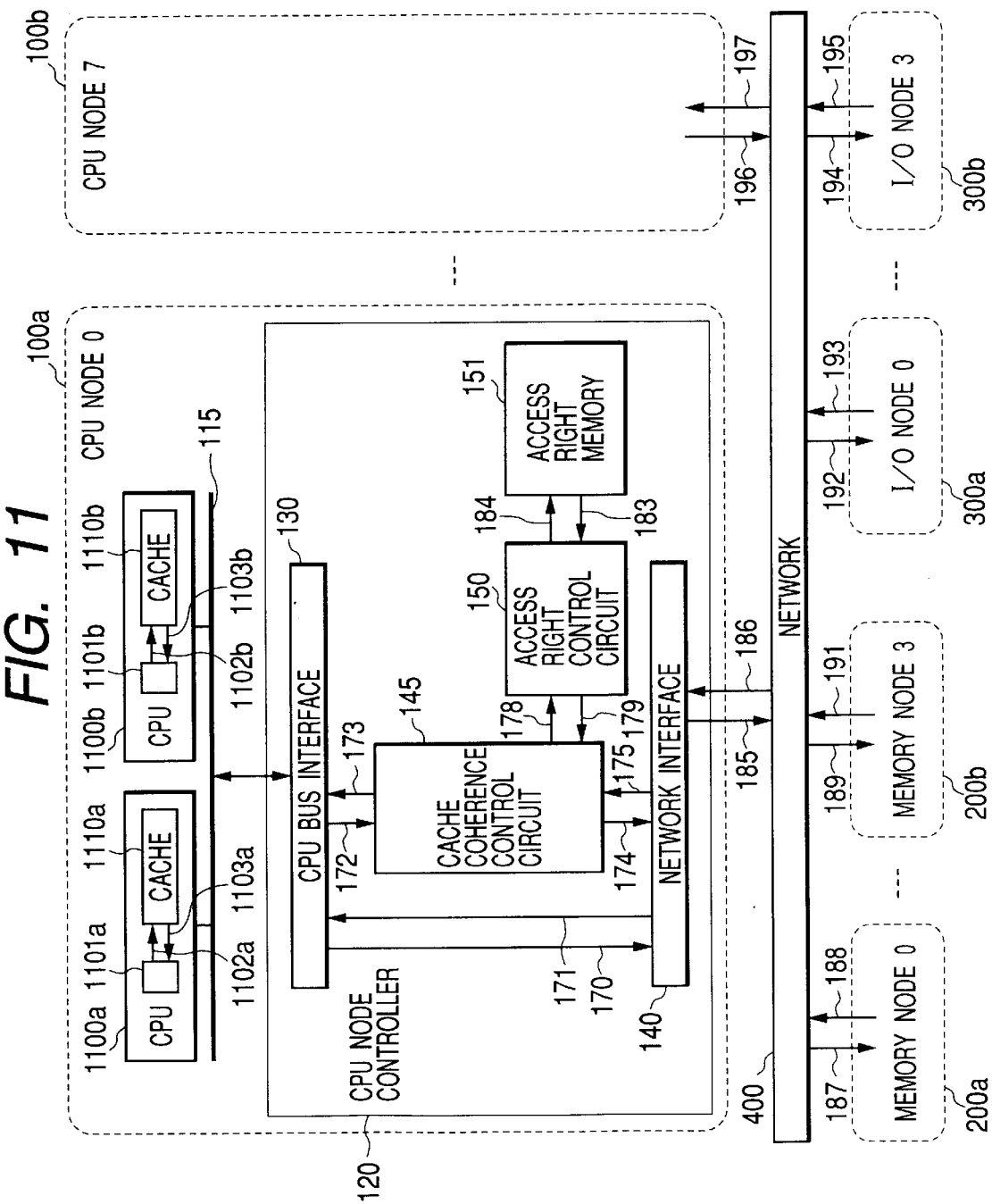

CACHE COHERENT CONTROL SYSTEM FOR NETWORK NODES ALLOWS CPU OR I/O DEVICE TO ACCESS TARGET BLOCK WITHOUT CACHE COHERENCE CONTROL, IF ASSOCIATED NODE HAS ACCESS RIGHT IN AN ACCESS RIGHT MEMORY TO TARGET BLOCK

BACKGROUND OF THE INVENTION

This invention relates to cache coherence control of a computer system, and more particularly to a cache coherence control system for ensuring coherency between caches of a plurality of CPU's, I/O devices and nodes of a parallel computer system constituted of a plurality of nodes interconnected by an interconnect network.

In a multi CPU system, a plurality of CPU's perform tasks by accessing a common main memory (shared memory). In such a system, as one CPU executes a main memory access, it becomes necessary to ensure cache coherency of all CPU's by checking, for example, the existence of modified data in caches of all other CPU's. This process is called cache coherence control.

In the reference document "SCALABLE SHARED-MEMORY MULTIPROCESSING", Daniel E. Lenoski et al., published by Morgan Kaufmann Publishers, pp. 16–19, there is a description about a cache coherence control method for a system having a plurality of interconnected CPU's. With this method, a main memory access issued by one CPU is transferred to all other CPU's to ensure cache coherency by checking, for example, the existence of modified data in the caches of all CPU's.

In a multi CPU system according to conventional techniques, in order to ensure cache coherency, it is necessary to broadcast a main memory access of one CPU to all CPU's and perform a cache coherence control at all CPU's of the system.

With these conventional techniques, the number of cache coherence control requests received at each CPU increases in proportion to the number of CPU's.

As the number of CPU's of a multi CPU system increases, the number of cache coherence control requests received at each CPU increases so that a cache access by each CPU becomes difficult. As the number of cache coherence control requests at each CPU transferred to the network interconnecting all CPU's of the system increases, the network may be saturated.

As a result, even if the number of CPU's of the multi CPU system is increased more than a certain number, the system performance cannot be improved.

A parallel computer system has general characteristics that many areas of a memory to be accessed are independent from each process or each thread, and it is rare for the memory to be shared by processes or threads.

Based upon such characteristics, the following approach may be made. A memory area once accessed by a node is assumed to be a memory area which can be accessed exclusively by this node, and when another node accesses this memory area, this memory area is considered as a shared area. In this manner, many memory areas can be accessed exclusively by each node. An access to such memory areas can be executed without cache coherence control so that the number of cache coherence requests can be reduced.

To realize this approach, each memory area is related to each access right. If some node has an access right to a target memory area, this node accesses this memory area without cache coherence control, whereas if the node has no access right, the node accesses this memory area by performing usual cache coherence control.

If a node is to access a memory area whose access right is possessed by another node, the other node with the access right is deprived of the access right. Thereafter, for a memory access to the memory area, the other node executes the cache coherence control.

Generally, a memory is accessed in the unit of a cache block. It is therefore natural to relate an access right to each memory block.

However, with this method, even if some node accesses some block and the access right to this block is given to the node, the number of cache coherence controls cannot be reduced unless the node accesses again this block.

Most of business applications have a low accessibility to the same memory block. Therefore, the above method is associated with the problem that the effects of reducing cache coherence control requests are poor.

SUMMARY OF THE INVENTION

It is an object of the present invention to provide a cache coherence control system capable of reducing the number of cache coherence control requests even for a program having a low accessibility to the same memory block.

In order to achieve the above object, according to a representative aspect of the invention, there is provided a cache coherence control system for caches which store, in the unit of a predetermined block, data of a shared memory accessed by a CPU or an I/O device provided at each of a plurality of nodes interconnected by a mutual interconnection network, wherein: in the cache coherence control system, each node has an access right memory for registering an access right entry representative of that the node has an access right to an extended block corresponding to a plurality of blocks of the shared memory; if the node of the CPU or I/O device has an access right to the extended block including a target block for a shared memory access, the target block in the shared memory is accessed without cache coherence control for caches of other nodes; and if the node of the CPU or I/O device has no access right to the extended block including the target block for the shared memory access, cache coherence control for the caches of other nodes are performed and when necessary the shared memory block is accessed.

In the cache coherence control system: the access right memory uses a portion of an address of the extended block as an access right row address, and a portion other than the access right row address of the extended block address of the shared memory as an access right entry tag; and the access right entry tag and one or more of the access right entries for storing the access right status are stored in the access right memory at a same access right row address.

In the cache coherence control system: in accessing the access right memory, the access right memory is read by using the access right row address obtained from the address of the extended block including the target access block of the shared memory; and an access right status of an access right entry among a plurality of access right entries at the access row address, the access right entry having an access right entry tag coincident with the access right entry tag obtained from the extended block address, is used as the access right status of the node.

The access right status includes three statuses: a status with an access right; a status without an access right; and a status with an indefinite access right.

In this case: when the CPU or I/O device issues the shared memory access with cache coherence control; the node of the CPU or I/O device searches the access right memory of the node; if the access right entry corresponding to the extended block including the target access block for the shared memory access does not exist in the access right memory of the node, or if the access right entry corresponding to the extended block exists in the access right memory of the node and the access right status in the access right entry is the status with an indefinite access right; cache coherence control is performed for caches in all other nodes relative to the target access block; an extended block storing status check is performed to check whether one or more blocks in the extended block including the target access block are stored in the cache of each of the other nodes; if the access right entry corresponding to the extended block including the target access block of the shared memory exists and the access right status of the access right is the status without an access right, cache coherence control is performed for the cache of each of all other nodes relative to the target access block; and if the access right entry corresponding to the extended block including the target access block of the shared memory exists and the access right status of the access right is the status with an access right, cache coherence control is not performed for the cache of each of the other nodes.

Further: when a shared memory access with a cache coherence control and extended block storing status check request is received from another node; cache coherence control is performed for the cache of the node relative to the target access block; it is checked whether each block in the extended block including the access target block is stored in the cache of the node, if even one block in the extended block is stored in the cache, it is judged that the extended block is stored in the node, whereas if none of the blocks are stored, it is judged that the extended block is not stored in the node; and the access right memory of the node is searched, and if the access right entry corresponding to the extended block including the target access block exists and the access right status in the access right entry is the status with an access right, the access right status is changed to the status without an access right; or the access right memory of the node is searched, and if the access right entry corresponding to the extended block including the target access block exists and the access right status in the access right entry is the status with an access right, the access right status is changed to the status without an access right if the extended block is stored in the node, whereas the access right status is changed to the status with an indefinite access right if the extended block is not stored in the node.

Further, when a shared memory access with a cache coherence control and extended block storing status check request is received from another node, cache coherence control is performed for the cache of the node relative to the access target block.

The access right status may include two statuses: a status with an access right; and a status with an indefinite access right.

In the cache coherence control system: each node has a block information memory for registering an address of a block stored in the cache of the CPU or I/O device upon issuance of the shared memory access with cache coherence control by the CPU or I/O device; and upon issuance of the shared memory access with cache coherence control by the CPU or I/O device, the address of the target block for the shared memory access is registered in the block information memory of the node of the CPU or I/O device.

In this case: the block information memory uses a portion of an address of the block of the shared memory as a row address, and a portion other than the row address of the block address of the shared memory as an entry tag, the entry tag and one or more of the entries for storing the entry status are stored in the block information memory at a same row address, and the entry status includes two statuses, a status valid and a status invalid; and when the CPU or I/O device issues the shared memory access with cache coherence control, a tag and the status valid obtained from the address of the target block for the shared memory access are registered in the block information memory of the node of the CPU or I/O device at the entry address obtained from the address.

Further: when the shared memory access with cache coherence control is received from another node; cache coherence control is performed for the cache of the node relative to the target block for the shared memory access; if the shared memory access is a write or a read with invalidation, the block information memory of the node is searched, and if an entry corresponding to the target block for the shared memory access is registered in the block information memory and the status of the entry is valid, the status of the entry is changed to invalid; when a shared memory access with a cache coherence control and extended block storing status check request is received from another node; cache coherence control is performed for the cache of the node relative to the target block; and if the shared memory access is a write or a read with invalidation, the block information memory of the node is searched, and if an entry corresponding to the target block is registered in the block information memory and the status of the entry is valid, the status of the entry is changed to invalid and an extended block status check is performed.

Further: when an entry of the block information memory is replaced by another new entry; a block corresponding to the target replace entry is removed from the cache of the node of the block information memory.

Further: when the CPU or I/O device writes back a block in the cache of the CPU or I/O device into the shared memory; the status of the entry corresponding to a target write-back block and stored in the block information memory of the node of the CPU or I/O device is set to invalid.

Further: as an extended block storing status check when a shared memory access with a cache coherence control and extended block storing status check request is received from another node; it is checked whether an address of each block of the extended block including the target block for the shared memory access is registered in the block information memory of the node, and if even one address is registered, it is judged that the extended block is stored in the node, whereas if no address is registered, it is judged that the extended block is not stored in the node.

According to the aspects of the invention described above, the access right memory and access right control circuit are provided in the node control circuit for controlling CPU's and I/O devices. When a block is accessed which is included in the extended block whose access right is already possessed by its CPU's or I/O devices, cache coherence control for other nodes can be omitted.

Since the access right management unit is made larger than the block size of CPU, the effects of reducing cache coherence control requests are high even if a business application having a low accessibility to the same memory block is executed.

Since the number of cache coherence control requests can be reduced, it is possible to reduce the traffics of cache coherence transactions flowing on the network and to lower the occurrence frequency of the cache coherence control at each CPU node. Memory access processes larger in number than conventional techniques can therefore be performed and the memory access throughput of the system can be improved. It is therefore possible to obtain a high performance even CPU's larger in number than conventional techniques are used.

Other aspects of the invention will become apparent from the description of the embodiments to follow.

BRIEF DESCRIPTION OF THE DRAWINGS

FIG. 11 is a diagram showing the structure of a parallel computer having a plurality of nodes interconnected by a network and equipped with a cache coherence control system according to a fourth embodiment of the invention.

DESCRIPTION OF THE EMBODIMENTS

<First Embodiment>

The first embodiment of the invention will be described with reference to FIGS. 1–6.

Figure 1:
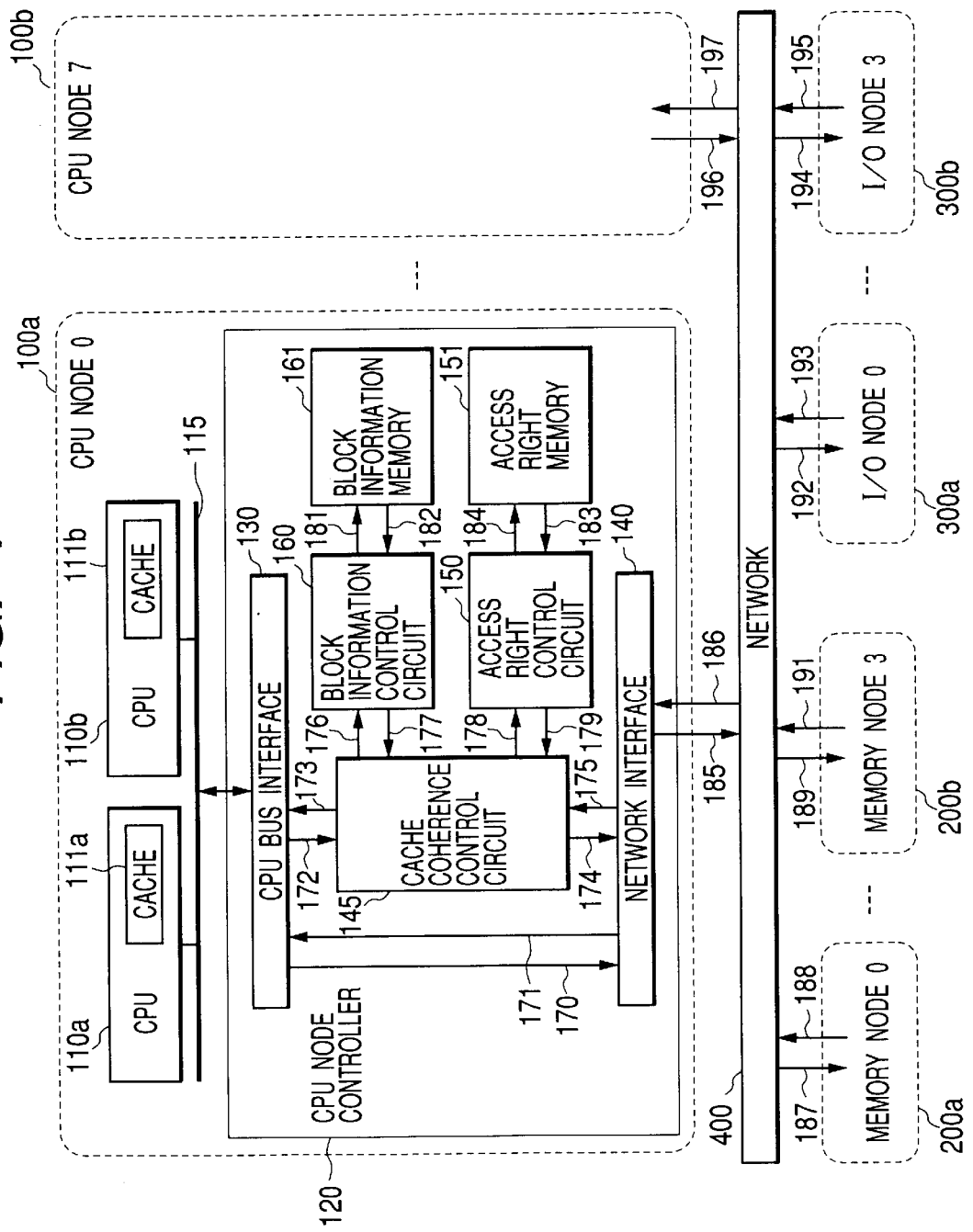
FIG. 1 is a diagram showing the structure of a parallel computer having a plurality of nodes interconnected by a network and equipped with a cache coherence control system according to a first embodiment of the invention.

FIG. 1 shows a parallel computer according to the invention.

The computer shown in FIG. 1 has eight CPU nodes 0–7 (100a–100b), four memory nodes 0–3 (200a–200b), and four I/O nodes 0–3 (300a–300b), respectively connected by a network 400.

The CPU nodes 0–7 (100a–100b), memory nodes 0–3 (200a–200b), and I/O nodes 0–3 (300a–300b) are connected by the network 400 via signal lines 185 to 197.

Each of the CPU nodes 100a–100b is constituted of two processors 110a and 100b and a CPU node control circuit 120 which are connected by a CPU bus 115.

CPU's have respective caches 111a and 111b therein (hereinafter called "internal cache").

The CPU node control circuit 120 includes:

a CPU bus interface 130 for signal transfer to and from CPU;

a network interface 140 for signal transfer to and from the network 400;

an access right memory 151 for storing an access right status, and an access right control circuit 150 for controlling the access right memory 151; and a block information memory 161 for storing address information of each block stored in the internal caches 111a and 111b of CPU's, and a block information control circuit 160 for controlling the block information memory 161.

The memory nodes 200a to 200b constitute a main memory of the parallel computer.

A physical memory address space of the parallel computer is shared by all CPU nodes 100a–100b.

The physical address space is divided into four areas which are dispersedly assigned to the memory nodes 200a–200b.

The I/O nodes 300a–300b constitute the input/output devices of the parallel computer.

A physical I/O address space of the parallel computer is shared by all CPU nodes 100a–100b.

The physical I/O address space is divided into four areas which are dispersedly assigned to the I/O nodes 300a–300b.

Each of the CPU's 110a–110b of each of the CPU nodes 100a–100b processes a program while accessing the memory and I/O nodes.

It is assumed that each of CPU's 110a–110b can cache the data read from the memory in a corresponding one of the caches 111a–111b.

In this embodiment, it is assumed that each of the CPU nodes 100a–100b can have an access right to an extended block including a target block to be accessed, only when the CPU node accesses the corresponding memory of the memory nodes 200a–200b.

Therefore, the invention is applicable only when a CPU node accesses a memory node. In this context, the I/O node is excluded in the following description.

Also in this embodiment, it is assumed that the I/O node has no access right memory. Therefore, if the I/O node accesses the memory, coherent control of the caches of the CPU nodes is performed by all means. The I/O node accesses the memory by issuing a memory access transaction like the CPU node in a status of no access right.

In this context, therefore, the access process from the I/O node is excluded in the following description.

If an I/O node has an access right memory, it performs the operation similar to that of the CPU node.

In this embodiment, it is assumed that the internal caches 111a–111b of CPU's operate in accordance with a well-known scheme, MESI protocol.

According to the MESI protocol, a plurality of CPU's can cache the same block in a Shared status.

On the other hand, only one CPU can cache a Modified block or an Exclusive block, and the other CPU's cannot cache such a block (Invalid).

In order to realize this, all memory access requests issued by a CPU of the CPU node which has no access right of the target block are distributed to all CPU nodes other than the requesting CPU and to the memory node to be accessed, and each CPU node performs a cache coherence control and a memory access is performed at the memory node.

The cache coherence control results of each CPU node are collected to generate the cache coherence control results of all CPU nodes and return the results to the requesting CPU node.

For example, in reading a memory, all CPU nodes receive a memory read request and all CPU's of the CPU nodes perform the cache coherence control.

More specifically, if a cache has a Modified block, each CPU writes back the block into the memory to make the block Invalid, whereas if a cache has an Exclusive block, this block is changed to a Shared block.

Therefore, the status of the block is either Invalid or Shared in all CPU's.

When the status of the internal caches of all CPU nodes becomes Invalid, the requesting CPU node sets the cache status of its CPU's to Exclusive.

When the status of the internal cache of one of CPU's becomes Shared, the requesting CPU node sets the cache status of its CPU's to Shared.

For a memory read request with Invalid to be issued by a CPU when a memory write instruction is executed, all CPU nodes receive the memory read request with Invalid to perform the cache coherence control of all CPU's of the CPU nodes.

Namely, if the cache has a Modified block, each CPU writes back the block and makes it Invalid, whereas if the cache has a Shared or Exclusive block, this block is made Invalid.

Therefore, the status of the block of each CPU becomes Invalid, and the requesting CPU node sets the cache stats of its CPU's to Exclusive.

In this embodiment, in order to reduce the amount of access requests distributed to all CPU nodes and to efficiently realize the above-described functions, each CPU node 100a registers an access right to an extended block in the access right memory 151.

When CPU accesses a memory, the access right memory of its CPU node is checked. If the access right to the extended block including the block to be accessed is registered in the access right memory, CPU accesses the memory without the cache coherence control at other nodes.

The details of the embodiment will be described.

(Address Space)

The parallel computer of this embodiment has an address space of 32 bits.

It is assumed that the block size of-each of the internal cache 111a, 111b of CUP 110a, 110b is 32B.

In the external of CPU, the memory area (address space of the memory nodes 200a–200b) is accessed in the block unit (32B).

(Transaction)

A memory access to be issued by CPU 110a, 110b includes three transactions: a memory read (RD: ReaD) transaction; a memory read and invalidate (RI: Read & Invalidate) transaction, and a memory write back (WB: Write Back) transaction.

These three transactions will be described in the following.

(Memory Read (RD) Transaction)

If the internal cache 110a–110b does not store a block to be accessed when CPU 110a–110b executes a memory read instruction (LD instruction), CPU issues a memory read (RD) transaction to the CPU bus 115.

The system reads the block from the memory or caches of other CPU nodes, and returns it back to the issuing processor. The issuing processor stores the returned block in its cache.

After the RD transaction is issued, the internal cache of the requesting CPU becomes either Exclusive or Shared.

After the RD transaction is received, the status of the internal caches of CPU's other than the issuing CPU becomes either Invalid or Shared.

(Read & Invalidate (RI) Transaction)

When CPU 110a–110b executes a memory write instruction (ST instruction), if the cache 111a–111b does not store the block to be accessed, or if the target block is stored in a Shared status, the CPU issues a memory read & invalidate (RI) transaction to the CPU bus 115.

The system invalidates the block stored in the CPU caches of other CPU's, reads the block from the memory or caches of other CPU nodes, and returns it back to the issuing processor. The issuing processor stores the returned block in its cache.

The issuing CPU can write the block exclusively read by the RI transaction in the internal cache 111a–111b.

After the RI transaction is issued, the status of the internal cache of the requesting CPU becomes Exclusive. After CPU writes the block in the internal cache thereof, the status of the block becomes Modified.

After the RI transaction is received, the status of the internal caches of CPU's other than the issuing CPU becomes Invalid.

(Memory Write Back (WB) Transaction)

When CPU 110a–110b writes back a previously written block in the memory (replace of cache block), the CPU issues a memory write back (WB) transaction.

The WB transaction is added with target write-back data, and the system stores the data of the write-back block into the memory.

(Transaction Format)

Figure 6:
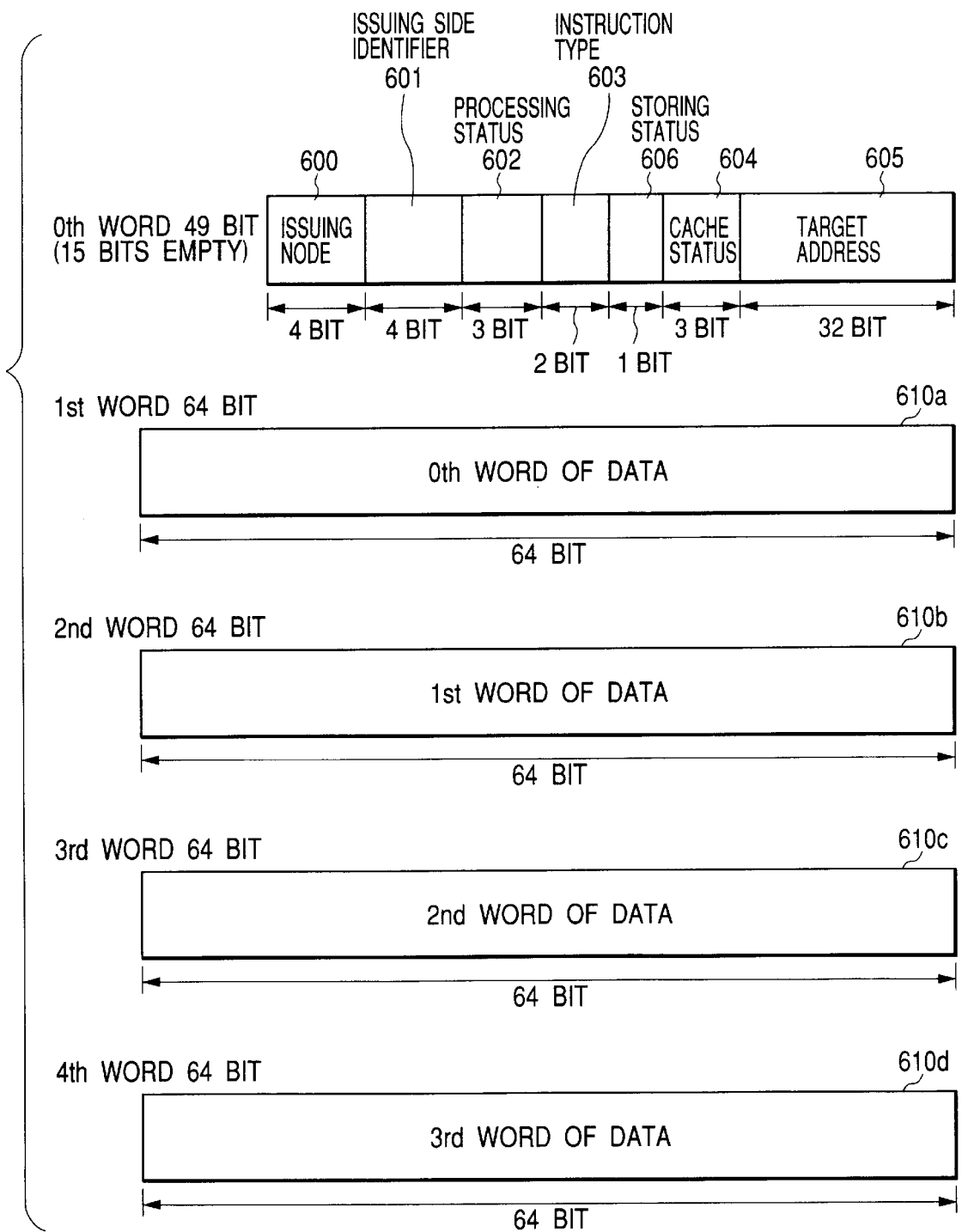
FIG. 6 is a diagram showing the structure of a transaction.

FIG. 6 shows the structure of a transaction to be transferred between the network 400 and the network interface 140, memory node 200a–200b and I/O node 300a–300b respectively of each CPU node.

One transaction is constituted of a 0th word which contains transaction control information and target address information, and 1st to 4th words 610a–610d constituting a data field.

An issuing node 600 of the 0th word is a field indicating a node number of the node issued the requesting transaction.

Issuing node numbers "0" to "7" indicate the CPU nodes 0–7 (100a–100b), and issuing node numbers "8" to "11" indicate the I/O nodes 0–3 (300a–300b).

Since the memory nodes 200a–200b don't issue a requesting transaction, they are not assigned the issuing node numbers.

An issuing side identifier 601 is a field indicating an identifier of the transaction in the node issued the requesting transaction.

A processing status 602 is a field indicating the status of the transaction of either:

an access request 000b with cache coherence control and extended bock status check;
an access request 001b with cache coherence control;
a request 010b with cache coherence control and extended block storing status check;
a cache coherence control request 011b;
a response 100b for cache coherence control and extended block storing status check;
a response 101b for cache coherence control;
an access response 110b; or
an access request 111b without cache coherence control).

An instruction type 603 is a field indicating the type of the requesting transaction (RD, RI, WB).

A cache status 604 is a field indicating a cache coherence control result (Invalid, Modified, Shared, Retry) at each CPU node.

Invalid or Shared indicates that the cache coherence control result by a CPU node changed the cache line status either to Invalid or to Shared.

Modified indicates that the cache coherence control result by a CPU node wrote back the Modified block into the memory by using a WB transaction and thereafter changed the cache block status to Invalid.

Retry indicates that some CPU node is now using the access right to the block and it is necessary to retry the transaction.

A target address 605 is a field indicating the address of the block to be accessed.

Data 0th word to 3rd word 610a–610d is a field to be used when the block to be accessed is transferred.

(Structure of CPU Node)

In this embodiment (FIG. 1), the CPU nodes 100a–100b are controlled by the CPU node control circuit 120.

The CPU node control circuit 120 is constituted of: the CPU bus interface 130 for data transfer to and from CPU 110a, 110b via the CPU bus 115; the network interface 140 for data transfer to and from the network 400 via signal lines 185 and 186; the cache coherence control circuit 145 for executing cache coherence control; the access right memory 151 for managing the access right; the access right control circuit 150 connected to the access right memory 151 via signal lines 183 and 184 for controlling the access memory 151; the block information memory 161 for managing caching information of each block of the extended block; and the block information control circuit 160 connected to the block information memory 161 via signal lines 181 and 182 for controlling the block information memory 161.

The cache coherence control circuit 145 transfers data to and from the CPU bus interface 130 and network interface 140 via signal lines 172–175.

The cache coherence control circuit 145 is connected to the block information control circuit 160 via signal lines 176 and 177, and to the access right control circuit 150 via signal lines 178 and 179.

The CPU bus interface 130 and network interface 140 are interconnected via signal lines 170 and 171 to transfer data therebetween.

(Block Information Memory)

In this embodiment, the block information memory is used to judge whether or not an access right to an extended block including the target block can be acquired.

The block information memory 161 stores the address of a block having a possibility that it is cached in the internal cache 111a, 111b of CPU 110a, 110b of its CPU node 100a, 100b.

Upon reception of an RD or RI transaction (transaction whose processing status 602 shown in FIG. 6 is an access request with cache coherence control and extended block status check and whose instruction type 603 is RD or RI) from another CPU node, it is checked whether each block of the extended block including the target access block is registered in the block information memory. If even one block in the extended block is registered in a valid status (it means that there is a possibility that some block in the extended block is cached in the internal cache of CPU of this CPU node), the access request is not given the access right to the extended block.

All CPU nodes other than the requesting CPU node perform an extended block storing status check. If every CPU node does not store a block in the target extended block in the valid status, the requesting CPU node can acquire the access right to the extended block.

In this embodiment, the access right is intended to mean a caching status that the target block can be accessed without a cache coherence control by other nodes, irrespective of the type of the transaction.

The block information memory is a memory to be referred instead of directly inquiring the block status to CPU 110a, 110b. Therefore, information of all blocks having a possibility that they are cached in the internal cache 111a, 111b of CPU 110a, 110b is required to be registered in the block information memory 161 (insurance of Inclusive).

From this reason, when a valid entry of the block information memory 161 is to be replaced by a new entry, the block registered in the entry to be replaced is replaced from the internal cache 111a, 111b of the CPU node to ensure Inclusive.

Conversely, when CPU 110a, 110b writes back (WriteBack) a block from the internal cache 111a, 111b into the memory, CPU 110a, 110b issues a WB transaction. When the node control circuit 120 receives the WB transaction, the status of the block registered in the block information memory 161 of its CPU node is invalidated.

When a block in the Shared or Exclusive status present in the internal cache of CPU is to be replaced by a new block, CPU does not generally issue a transaction such as a WB transaction.

If a transaction is not issued for the replace, it is impossible to always make coherent the information in the block information memory and in the internal cache. Therefore, the block information memory registers in some cases the block having a possibility that it was cached in the internal memory of CPU.

Next, the internal structure of the block information memory will be described.

Figure 2:
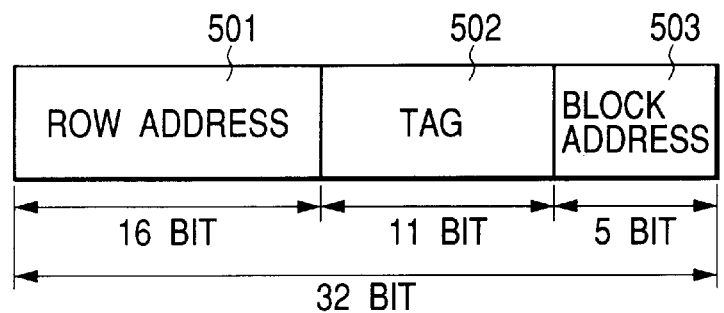
FIG. 2 is a diagram showing the structure of an address of a block information memory.

The block information memory 161 analyzes a target access address in the manner illustrated in FIG. 2.

Upper sixteen bits of a 32-bit address are used as a row address 501 of the block information memory 161, lower five bits are used as an in-block address 503, and the remaining eleven bits are used as a tag 502.

Therefore, the number of rows of the block information memory 161 is 64K (row address=16 bits).

Figure 3:
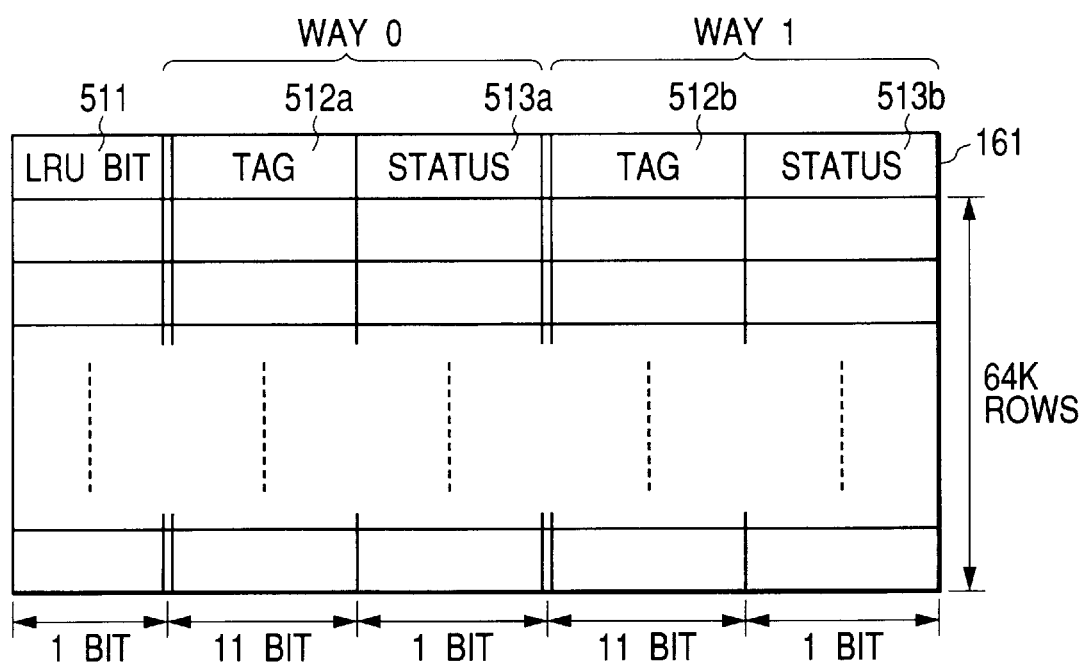
FIG. 3 is a diagram showing the structure of the block information memory.

The structure of the block information memory 161 is shown in FIG. 3.

The block information memory 161 has 64K rows, and has a two-way structure capable of registering two entries at the same row address.

Each row of the block information memory 161 is constituted of an LRU bit 511, information on way 0 and information on way 1.

The LRU bit 511 has one bit representative of the latest accessed way.

A target way to be replaced when a new entry is registered is the way opposite to the way represented by the LRU bit.

If the LRU bit 511 is "0", the target replace way is way 1, whereas if it is "1", the target replace way is way 0.

The information of way 0 and way 1 is constituted of tags 512a and 512b and statuses 513a and 513b, respectively.

The value in the tag field 502 shown in FIG. 2 is stored in a corresponding one of the tags 512a and 512b.

The status 513a, 513b has two statuses Valid and Invalid (0: Invalid, 1: Valid) indicating the status valid/invalid of the registered block information.

In searching the block information memory, a row address 501 is obtained from the upper sixteen bits of an address of a target block to access way 0 and way 1 of the block information memory 161 at the obtained row address. Matching is performed between the tags 512a and 512b of the two entries stored at the row address and the value of the tag field 502 of the target block address. If the value of the tag field 502 matches one of the entries, the status 513a, 513b of the matched entry is read.

In registering a block address in the block information memory 161, a row address 501 is obtained from the upper sixteen bits of the target block address to access the block information memory 161 at the obtained row address. If the status of one or both of the ways is Invalid, the tag 502 of the target block address is stored in the tag field of the entry of the Invalid way to set the status of the entry to Valid.

If there is no way in the status Invalid, the way indicated by the LRU bit is replaced, and the tag 502 of the target block address is stored in the tag field of the Invalid way to set the status of the entry to Valid.

In this case, the CPU node control circuit 120 issues a CPU bus transaction BI (Bus Invalidate) to the CPU bus 115 to invalidate the block at the address stored in the replace target way and replace the target block from the internal cache 111*a*, 111*b* of CPU 110*a*, 110*b*.

In this case, if the target block is stored in the internal cache 111*a*, 111*b* in the Modified status, then CPU 110*a*, 110*b* issues a WB transaction to the CPU node control circuit 120 to write back the Modified block into the memory.

(Access Right and Access Right Memory)

The access right memory 151 manages an access right of an extended block associated with a block accessed by CPU 110*a*, 110*b* of its CPU node 100*a*, 100*b*, in the unit of an extended block constituted of a plurality of blocks.

The access right used in this invention means that a target block can be accessed without cache coherence control by other nodes, irrespective of the type of a memory access transaction.

When CPU 110*a*, 110*b* issues a memory access, first its CPU node 100*a*, 100*b* searches the access right memory 151. If the access right to the extended block including the target block is registered in the access right memory 151, a memory access is performed without any cache coherence control at other nodes.

If the access right is not registered, the cache coherence control is performed at other nodes and an extended block storing status check is performed for checking whether each block in the extended block including the target block is cached in other CPU nodes. If all blocks in the extended block are not cached in other CPU nodes, when the requesting CPU node acquired the access right to the extended block, the access right is registered in the access right memory of its CPU node.

The access right is processed not in the unit of a block but in the unit of an extended block constituted of a plurality of consecutive blocks.

In this embodiment, the size of the extended block is four times that of a block.

Since the memory accesses have a certain continuity, CPU 110*a*, 110*b* continuously accesses several adjacent blocks.

In order to utilize such characteristics, the management unit of an access right is made larger than the block.

It is assumed that when CPU 110*a*, 110*b* accesses a block, the access right to the extended block including the accessed block is acquired.

When CPU 110*a*, 110*b* accesses a block adjacent to the previously accessed block and if the newly accessed block is included in the same extended block, this access to the adjacent block can be performed without cache coherence control at other nodes.

As compared to the management of the access right in the block unit, a possibility of accessing a block without cache coherence control becomes higher.

The memory is managed for each page. If the space exceeding the page size is consecutively accessed in the logical address space, the continuity in the area exceeding the page size cannot be ensured in the physical address space.

The maximum size of an extended block is therefore the page size.

Namely, the size of an extended block can be set in a range from two times the block size to the memory page size Next, the internal structure of the access right memory will be described.

Figure 4:
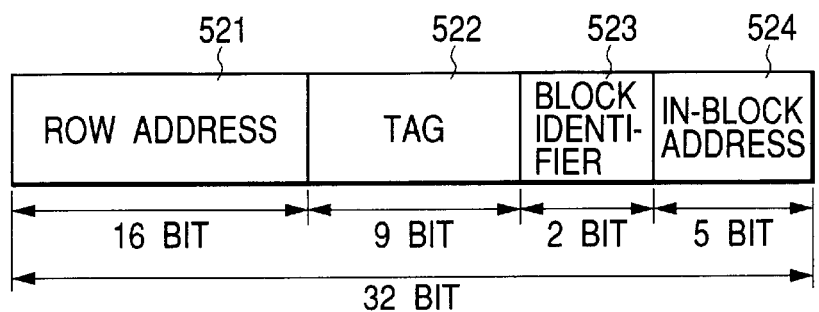
FIG. 4 is a diagram showing the structure of an address of an access right memory.

The access right memory analyzes a target block address in a manner illustrated in FIG. 4.

Upper sixteen bits of a 32-bit address are used as a row address 521 of the access right memory 151, and lower seven bits are used as an extended block address. Upper two bits of the seven bits of the extended block address are used as a block identifier 523, and lower five bits thereof are used as an in-block address 524.

The remaining nine bits of the target block address subtracted by sixteen bits of the row address 521 and seven bits of the extended block address are used as a tag 522.

Since the row address has 16 bits, the number of rows of the access right memory is 64K.

Figure 5:
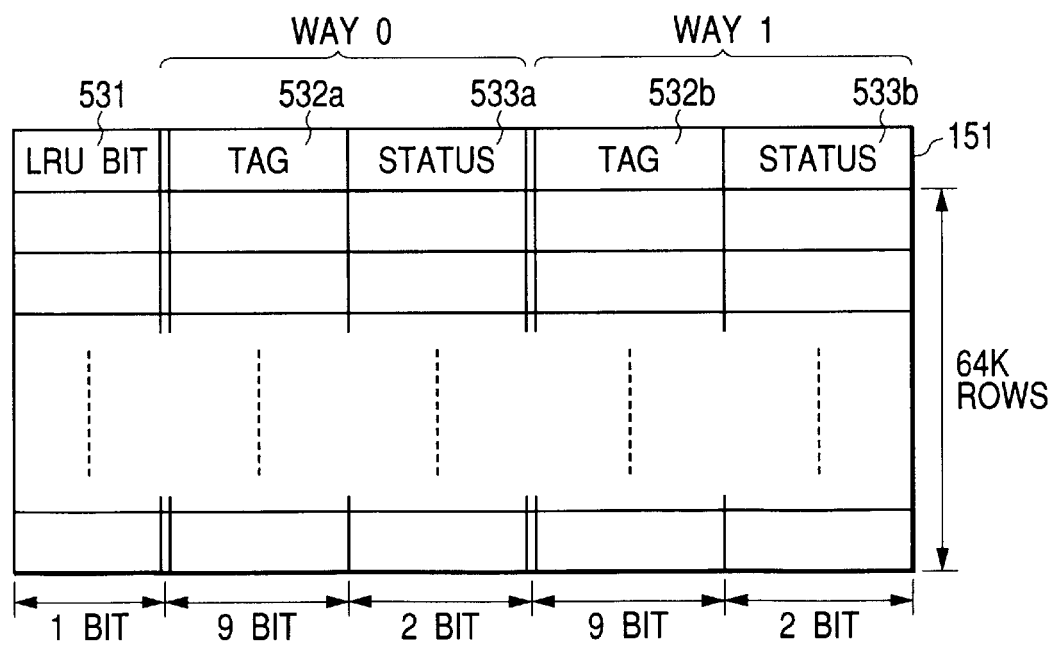
FIG. 5 is a diagram showing the structure of the access right memory.

The structure of the access right memory 151 is shown in FIG. 5.

The access right memory 151 has 64K entries per way, and has a two-way structure capable of registering two extended block addresses at the same row address.

Each slot of the access right memory 151 is constituted of an LRU bit 531, information on way 0 and information on way 1.

The LRU bit 531 has one bit representative of the latest accessed way.

A target way to be replaced when a new entry is registered is the way opposite to the way represented by the LRU bit 531.

If the LRU bit 531 is "0", the target replace way is way 1, whereas if it is "1", the target replace way is way 0.

The information of way 0 and way 1 is constituted of tags 532*a* and 532*b* and statuses 533*a* and 533*b*, respectively.

The value in the tag field 522 shown in FIG. 4 is stored in a corresponding one of the tags 532*a* and 532*b*.

The status 533*a*, 533*b* has three statuses: with an access right; without an access right; and an indefinite access right (with an access right: 10, without an access right: 01, and an indefinite access right: 00), and indicates the status of the registered extended block.

Each status will be described.

"With an access right" means that all other CPU nodes do not cache all blocks in the extended block in the internal caches so that the subject CPU node has an access right to the extended block.

Therefore, the access right entry for the extended memory including the target access block exists in the access right memory 151 of the subject CPU node, and the access right status of the entry allows a memory access without the cache coherence control at other nodes, irrespective of the type of the shared memory access.

"Without an access right" means that there is a possibility that one or more other CPU's cache one or more blocks in the extended block into the internal caches.

Therefore, the CPU node without an access right accesses the target block by performing the cache coherence control at all other nodes by all means, when accessing the shared memory.

However, the extended block storing status check is not performed, which is otherwise performed to check whether each block in the extended block is cached by another node.

The reason for this is as follows. Since the access right status is without an access right, there is a possibility that another node caches a block in the extended block so that even if the extended block storing status check is performed, there still remains a possibility that an exclusive access right to the extended block cannot be acquired.

"An indefinite access right" means that whether another CPU node is caching a block in the extended block in the internal cache is indefinite.

Therefore, a CPU node with an indefinite access right accesses the target block by performing the cache coherence control at all other nodes by all means when accessing the shared memory.

The extended block storing status check is also performed and the obtained access right status (with an access right or without an access right) is registered in the access right memory of the subject CPU node.

In searching the access right memory, a row address 521 is obtained from the upper sixteen bits of an address of a target block to access way 0 and way 1 of the access right memory 151 at the obtained row address. Matching is performed between the tags 532a and 532b of the two entries stored at the row address and the value of the tag field 522 of the target block address. If the value of the tag field 522 matches one of the entries, the status 533a, 533b of the matched entry is read.

In registering an access right in the access right memory 151, a row address 521 is obtained from the upper sixteen bits of the target block address to access the access right memory 151 at the obtained row address. If the status of one or both of the ways are "an indefinite access right", the tag 522 of the address of the target block is stored in the tag field 532a, 532b of the way with the indefinite access right, and the access right status is set to the status 533a, 533b of this entry.

It there is no way with an indefinite access right, the way opposite to the way indicated by the LRU bit is replaced, the tag 522 of the address of the target block is stored in the tag 532a, 532b in the entry of the replaced way, and the access right status is set to the status 533a, 533b of this entry.

Each constituent element of this embodiment has been described above.

In the following, the transaction process of the embodiment will be described.

(Transaction Process)

In the following, the transaction process of each of the RD, RI, and WB transactions will be described.

(Memory Read by CPU)

(1) Issuance of Memory Read (RD) by CPU

When CPU (e.g., CPU 110a) executes a memory read instruction for an address "A", the CPU checks whether the block corresponding to the address "A" exists in the internal cache 111a.

If the block exists in the internal cache 111a, data in this block is used as the result of the read instruction (termination).

If the block does not exist in the internal cache 111a, CPU 110a issues an RD transaction for the address "A" to the CPU bus 115.

(2) Cache Coherence Control on CPU Bus

Upon reception of the RD transaction for the address "A", CPU 110b connected to the same CPU bus 115 as CPU 110a performs the cache coherence control for the internal cache 111b in the following manner.

(2-1) If CPU 110b does not store the block corresponding to the address "A":

then the processor 110b returns a cache status Invalid to the CPU bus 115.

(2-2) If CPU 110b stores the block corresponding to the address "A" in the status Shared or Exclusive:

then CPU 110b returns a cache status Shared to the CPU bus 115.

If the status of the block is Exclusive, the status is changed to Shared.

(2-3) If CPU 110b stores the block corresponding to the address "A" in a status Modified:

then CPU 110b returns a cache status Modified to the CPU bus 115.

In addition, by using the WB transaction, the cache block is returned and the status of the block is changed to Invalid.

Upon reception of a notice of the status Modified from the CPU bus 115, CPU 110a receives the WB transaction issued by CPU 110b, writes the target access block in the internal cache 111a, and changes the status of this block to Exclusive.

(3) Hit Check of Access Right Memory and Block Information Memory

The CPU bus interface 130 receives the RD transaction (1) or the cache status response and/or WB transaction (2-1) to (2-3).

The CPU bus interface 130 transfers the RD transaction and cache status response to the cache coherence control circuit 145 via the signal line 172.

Upon reception of the RD transaction (1), the cache coherence control circuit 145 sends a hit check request to the access control circuit 150 via the signal line 178 in order to make the circuit 150 check whether the access right to the extended block (EB) including the block corresponding to the address "A" is registered in the access right memory 151.

Upon reception of the hit check request, the access right control circuit 150 reads the row (T1a) corresponding to the row address field 521 (A1a) of the address "A" from the access right memory 151.

Of the two ways of T1a, the way (Wa) having the tag 532a, 532b coincident with the tag field 522 (Ata) of the address "A" is searched.

If Wa does not exist, the way is determined to be stored in which is the access right to the extended block including the target memory read block corresponding to the address "A", and this way is determined as Wa.

The method of determining the way is as follows:

If the way having the status 00b (an indefinite access right, b is a symbol representative of a binary notation) exists, this way is used.

If the way having the status 00b does not exist, the way 1 is used if the LRU bit 531 of the row (T1a) of the access right memory 151 is "0", whereas the way 0 is used if it is "1".

In this case, the status of the way to be used is set to 00b and the LRU bit 531 is inverted.

Thereafter, the access control circuit 150 sets the access right to Wa in use until the transaction is completed, and makes a transaction from its and other CPU's to be retried.

When the access right status of the target extended block is read from the access right memory 151, the access right control circuit 150 transfers the access right status to the cache coherence control circuit 145 via the signal line 179.

The cache coherence control circuit also sends a request to the block information control circuit 160 via the signal line 176 to make the circuit 160 register the entry of the block corresponding to the address "A" in the block information memory 161.

Upon reception of this block registration request, the block information control circuit 160 accesses the block information memory 161 to check whether the block corresponding to the address "A" is registered.

If not registered, the tag of the block corresponding to the address "A" is registered in the tag field of the entry of the way opposite to the way indicated by the LRU bit, and the entry status is set to Invalid (the status set to Invalid is set to Valid at (14-2)).

(4) Issuance of Memory Read Request Transaction to Memory

The cache coherence control circuit 145 sends the address "A", read (RD) request and access right status to the network interface 140 via the signal line 174 to thereby instruct to issue an RD request transaction.

The network interface 140 issues the RD request transaction (Trd) to the network 400 via the signal line 185.

The RD request transaction Trd is a transaction which stores: the number of its CPU node 100a in the issuing node 600 shown in FIG. 6; an identifier of the transaction determined by the network interface 140 in the issuing side identifier 601; one of 000b (access request with cache coherence control and extended block status check), 001b (access request with cache coherence control) and 111b (access request without cache coherence control) in the processing status 602; "0" (RD) in the instruction type 603; and the address "A" in the target address 605.

The processing status 602 is determined by the result of the hit check (3). Namely, the processing status 602 is set to 111b (access request without cache coherence control) if the access right status of the extended block corresponding to the address "A" is "with an access right", to 001b (access request with cache coherence control) if "without an access right, or to 000b (access request with cache coherence control and extended block storing status check) if "an indefinite access right.

(5) Transfer of Memory Read Request Transaction from Network

The network 400 acquires a target memory node (e.g., 200a) from the upper three bits of the target address 605 of the DR request transaction Trd and transfers Trd to the target memory node 200a.

If the processing status 602 of Trd is the access request (000b) with the cache coherence control and extended block storing status check, the processing status 602 of Trd is changed to the access request (010b) with the cache coherence control and extended block storing status check, and Trd is transferred to all CPU nodes excepting the issuing CPU node.

If the processing status 602 of Trd is the access request (001b) with the cache coherence control, the processing status 602 of Trd is changed to the access request (011b) with the cache coherence control, and Trd is transferred to all CPU nodes excepting the issuing CPU node.

If the processing status 602 of the RD request transaction Trd is the access request (111b) without the cache coherence control, the process advances to (12) to be described later, whereas if not, the process advances to (6) to be described below.

(6) Reception of Cache Coherence Control and Extended Block Storing Status Check Request, or Cache Coherence Control Request at Other CPU's If the requesting CPU node issues the access request with the cache coherence control and extended block storing status check in the process (4), the network interface 140 of another CPU node 100a–100b receives an RD cache coherence control and extended block storing status check request transaction from the network 400.

If the requesting CPU node issues the access request with the cache coherence control in the process (4), the network interface 140 of another CPU node 100a–100b receives an RD cache coherence control request transaction from the network 400.

The network interface 140 transfers the type of the transaction and the address "A" received via the signal line 175 to the cache coherence control circuit 145, and instructs the cache coherence control circuit 145 to execute an RD cache coherence control and extended block storing status check process, or an RD cache coherence control.

In the following, each of the case that a CPU node receives the RD cache coherence control and extended block storing status check process and the case that a CPU node receives the RD cache coherence control, will be described divisionally.

(Reception of RD Cache Coherence Control and Extended Block Storing Status Check Process)

(7) Check of Access Right Memory at Other CPU's

The cache coherence control circuit 145 sends a request to the access right control circuit 150 via the signal line 178 to make the circuit 150 perform a hit check of the access right memory 151 relative to the extended block EB including the block corresponding to the address "A", in a manner similar to the process (3).

(7-1) If the access right entry corresponding to EB is registered in the access right memory 151 and the corresponding CPU node issued a memory access using this access right, then the access right control circuit 150 returns an access right status Retry (instruction to issue the transaction again) to the cache coherence control circuit 145 via the signal line 179.

(7-2) If the access right entry corresponding to EB is registered in the access right memory 151 and the corresponding CPU node did not issue a memory access using this access right, then the access right control circuit 150 sets the access right entry in use until the status of the access right entry is updated, makes a transaction from its and other CPU's using this entry to be retried. The access right status Retry for the entry is returned to the cache coherence control circuit 145.

(7-3) If the access right entry corresponding to EB is not stored in the access right memory 151, "an indefinite access right" is returned to the cache coherence control circuit 145 as the access right status.

(8) Cache Coherence Control at CPU's of Other CPU Nodes

If the access right status acquired by the check process (7) for the access right memory is not Retry, the cache coherence control circuit 145 issues an RD cache coherence control request to the CPU bus interface 130 via the signal line 173.

Upon reception of the RD cache coherence control request, the CPU bus interface 130 issues an RD transaction to the CPU bus 115 in order to perform the cache coherence control at CPU's of the CPU node.

CPU 110a, 110b connected to the CPU bus 115 executes an RD cache coherence control.

Specifically, CPU having the Modified block corresponding to the address "A" returns the cache status Modified, and transfers the Modified block to the CPU bus interface 130 via the CPU bus 115 by using a WB transaction.

CPU having the block corresponding to the address "A" in the status Exclusive or Shared changes the cache status of the block corresponding to the address "A" to the status Shared and returns the cache status Shared.

CPU having no block at the address "A" returns the cache status Invalid.

The CPU bus interface 130 receives the cache status from the CPU bus 115, and transfers it to the cache coherence control circuit 145 via the signal line 172.

When the WB transaction is received, the Modified block is transferred to the network interface via the signal line 170.

The cache coherence control circuit 145 determines the cache status of a block corresponding to the address "A" at the node as in the following.

If the access right status is Retry, the cache status at the node is set to Retry.

If the access right status is a status other than the status Retry, the cache status of CPU is used as the cache status of the node.

(9) Extended Block Storing Status Check at Other CPU Nodes

If the cache status is the cache status Modified at the process (8), the cache coherence control circuit 145 sends an invalidating request for the block corresponding to the address "A" to the block information control circuit 160 via the signal line 176 in order to invalidate the block corresponding to the address "A" registered in the block information memory 161.

The cache coherence control circuit 145 also sends an extended block storing status check request to the block information control circuit 160 via the signal line 176 to make the circuit 160 check whether each block in the extended block corresponding to the address "A" is registered in the block information memory 161 of its CPU node.

The block information control circuit 160 performs the extended block storing status check by the following procedure.

The block information control circuit 160 checks whether addresses A–D of the blocks of the extended block corresponding to the address "A" are registered in the block information memory 161.

If the entries corresponding to the addresses A–D are registered in the block information memory 161 and if there is even one status Valid, then the block information control circuit 160 judges that the extended block is stored by the node, and returns the storing status "1" to the cache coherence control circuit 145 via the signal line 176.

If none of the entries corresponding to the addresses A–D are registered in the block information memory 161 or if the entries registered have all the Invalid status, then the block information control circuit 160 judges that the extended block is not stored by the node and returns a non-storing status "0" to the cache coherence control circuit 145 via the signal line 176.

(10) Update of Access Right Memory by Other CPU Nodes

When the cache coherence control circuit 145 receives the access right status from the access right control circuit 150 as the result of the process (7), the cache status from the CPU bus interface as the result of the process (8) and the extended block storing status check result from the block information control circuit 160 as the result of the process (9), the cache coherence control circuit 145 makes the access right control circuit 150 update the access right status of the extended block corresponding to the address "A".

If the access right status is "with an access right" and the extended block storing status check result is a storing status, then the access right is changed to "without an access right".

If the access right status is "with an access right" and the extended block storing status check result is a non-storing status, then the access right is changed to "an indefinite access right".

If the access right status is "without an access right" and the extended block storing status check result is a non-storing status, then the access right is changed to "an indefinite access right".

Then, the access right entry for the extended block is made not in use.

When the access right memory is updated, the cache coherence control circuit 145 transfers the cache status and the extended block storing status check result to the network interface 140 via the signal line 174.

(11) Return of Cache Coherence Control Result and Extended Block Storing Status Check Result from Other Nodes The network interface 140 executes the following processes in accordance with the block status received from the cache coherence control circuit 145.

(11-1) For the block status Modified

The network interface 140 transfers the Modified block to the network 400 by using an RD cache coherence control and extended block storing status check response transaction.

The RD cache coherence control and extended block storing status check response transaction used is a transaction which stores: a cache coherence control and extended block storing status check response in the processing status 602 of the RD cache coherence control and extended block storing status check request transaction; a status Modified in the cache status 604; and the Modified block divided into four parts in the data field 610*a*–610*d*.

(11-2) For the block status other then Modified

The network interface 140 transfers the RD cache coherence control and extended block storing status check response transaction to the network 400.

The RD cache coherence control and extended block storing status check response transaction used is a transaction which stores: a cache coherence control and extended block storing status check response in the processing status 602 of the RD cache coherence control and extended block storing status check request transaction; and a block status obtained by the cache coherence control at CPU in the cache status 604.

(Reception of RD Cache Coherence Control)

(7) Check of Access Right Memory at Other CPU's

This process is not executed if the request is the RD cache coherence control.

(8) Cache Coherence Control at CPU's of Other CPU Nodes

The cache coherence control circuit 145 issues an RD cache coherence control request to the CPU bus interface 130 via the signal line 173.

Upon reception of the RD cache coherence control request, the CPU bus interface 130 issues an RD transaction to the CPU bus 115 in order to perform the cache coherence control at CPU's of the CPU node.

CPU 110*a*, 110*b* connected to the CPU bus 115 executes an RD cache coherence control.

Specifically, CPU having the Modified block corresponding to the address "A" returns the cache status Modified, and transfers the Modified block to the CPU bus interface 130 via the CPU bus 115 by using a WB transaction.

CPU having the block corresponding to the address "A" in the status Exclusive or Shared changes the cache status of the block corresponding to the address "A" to the status Shared and returns the cache status Shared.

CPU 130 having no block at the address "A" returns the cache status Invalid.

The CPU bus interface 130 receives the cache status from the CPU bus 115, and transfers it to the cache coherence control circuit 145 via the signal line 172.

When the WB transaction is received, the Modified block is transferred to the network interface via the signal line 171.

The cache coherence control circuit 145 uses the cache status of CPU as the cache status of the node.

(9) Extended Block Storing Status Check at Other CPU Nodes

If the cache status is the cache status Modified at the process (8), the cache coherence control circuit 145 sends an invalidating request for the block corresponding to the address "A" to the block information control circuit 160 via the signal line 176 in order to invalidate the block corresponding to the address "A" registered in the block information memory 161.

If the request is the RD cache coherence control, the extended block storing status check is not performed.

(10) Update of Access Right Memory by Other CPU Nodes

If the request is the RD cache coherence control, the access right memory is not updated.

The cache coherence control circuit 145 transfers the block status to the network interface 140 via the signal line 174.

(11) Return of Cache Coherence Control Result and Extended Block Storing Status Check Result from Other Nodes The network interface 140 executes the following processes in accordance with the block status received from the cache coherence control circuit 145.

(11-1) For the block status Modified

The network interface 140 transfers the Modified block to the network 400 by using an RD cache coherence control response transaction.

The RD cache coherence control response transaction used is a transaction which stores: a cache coherence control response in the processing status 602 of the RD cache coherence control request transaction; a status Modified in the cache status 604; and the Modified block divided into four parts in the data field 610a–610d.

(11-2) For the block status other then Modified

The network interface 140 transfers the RD cache coherence control response transaction to the network 400.

The RD cache coherence control response transaction used is a transaction which stores: a cache coherence control response in the processing status 602 of the RD cache coherence control request transaction; and a block status obtained by the cache coherence control at CPU in the cache status 604.

(12) Return of Memory Data from Memory Node

Upon reception of the RD access request transaction (without cache coherence control, with cache coherence control and extended block storing status check, with cache coherence control) from the network 400 by the process (5), the target memory node 200a reads the block corresponding to the address "A", and returns an RD access response transaction to the network 400.

The RD access response transaction is a transaction which stores an access response in the processing status 602 of the RD access request transaction and the read block in the data fields 610a–610d.

(13) Return of Cache Coherence Control Result and Memory Data by Network

The network 400 executes the following processes in accordance with the type of a received response transaction.

(13-1) Upon reception of the RD access response transaction from the target memory node, the network 400 transfers it to the issuing CPU node of the request transaction designated by the issuing node 600 of the request transaction.

(13-2) When the RD cache coherence control and extended block storing status check response transaction is received from all CPU nodes, these transactions are handled in the following manner, and a new RD cache coherence control and extended block storing status check response transaction is generated and returned to the issuing CPU node of the request transaction designated by the issuing node 600.

If there is a transaction having the status Retry as the cache status 604, this transaction is used as the RD cache coherence control and extended block storing status check response transaction.

If there are transactions having the status Modified as the cache status 604, these transactions are selected. If there is a transaction whose storing status 606 is a storing status, the storing status 606 of the selected transaction is set to a storing status, whereas if there are transactions whose storing statuses are a non-storing status, the storing status 606 of the selected transaction is set to a non-storing status. The selected and set transaction is used as the RD cache coherence control and extended block storing status check response transaction.

If there are transactions having the status Shared as the cache status 604, these transactions are selected. If there is a transaction whose storing status 606 is a storing status, the storing status 606 of the selected transaction is set to a storing status, whereas if there are transactions whose storing statuses are a non-storing status, the storing status 606 of the selected transaction is set to a non-storing status. The selected and set transaction is used as the RD cache coherence control and extended block storing status check response transaction.

In other cases, one of the received transactions is selected, and the cache status 604 thereof is set to Invalid. If there is a transaction whose storing status 606 is a storing status, the storing status 606 of the selected transaction is set to a storing status, whereas if there are transactions whose storing statuses are a non-storing status, the storing status 606 of the selected transaction is set to a non-storing status. The selected and set transaction is used as the RD cache coherence control and extended block storing status check response transaction.

(13-3) When the RD cache coherence control response transaction is received from all CPU nodes, these transactions are handled in the following manner, and a new RD cache coherence control response transaction is generated and returned to the issuing CPU node of the request transaction designated by the issuing node 600.

If there is a transaction having the status Retry as the cache status 604, this transaction is used as the RD cache coherence control response transaction.

If there is a transaction having the status Modified as the cache status 604, this transaction is used as the RD cache coherence control response transaction.

If there is a transaction having the status Shared as the cache status 604, this transaction is used as the RD cache coherence control response transaction.

In other cases, one of the received transactions is selected, and used as the RD cache coherence control and extended block storing status check response transaction.

(14) Update of Access Right and Block Information

The network interface 140 of the requesting CPU node receives and processes the response transaction in accordance with the type of the issued request transaction in the following manner.

(14-1) If the request transaction is an access transaction without an RD cache coherence control, the network interface 140 of the transaction issuing CPU node 100a receives the RD access response transaction and transfers the transaction data 610a–610d to the CPU bus interface 130 via the signal line 171.

(14-2) If the request transaction is an access request transaction with the RD cache coherence control and extended block storing status check request, the network interface 140 of the transaction issuing CPU node 100a receives the RD access response transaction and the RD cache coherence control and extended block storing status check response transaction.

The network interface 140 transfers the cache status 604 and storing status 606 to the cache coherence control circuit 145 via the signal line 175.

The cache coherence control circuit 145 transfers the cache status 604 to the CPU bus interface via the signal line 173.

If the cache status is a status other than the status Retry, the cache coherence control circuit 145 registers the access right status of the extended block including the block corresponding to the address "A" in Wa of the access right memory 151. In this case, if the storing status (extended block storing status check result) is a storing status, the access right status is set to "without an access right", whereas if the storing status is a non-storing status, the access right status of the access right entry to be registered is set to "with an access right". Then, Wa is set not in use.

The cache coherence control circuit 145 sends a request to the block information control circuit 160 via the signal line 176 to make the circuit 160 register the status Valid of the block corresponding to the address "A" in the block information memory 161.

If the entry status corresponding to the address "A" in the block information memory 161 is Invalid, the block information control circuit 160 changes the entry status to Valid.

If the cache status is a status Modified, the network interface 140 transfers the data 610a–610d of the received RD cache coherence control and extended block storing status check response transaction to the CPU bus interface via the signal line 171. If the cache status is a status other than the status Modified, the network interface 140 transfers the data 610a–610d of the received RD access response transaction to the CPU bus interface via the signal line 171.

(14-3) If the request transaction is an access request transaction with the RD cache coherence control, the network interface 140 of the transaction issuing CPU node 100a receives the RD access response transaction and the RD cache coherence control response transaction.

The network interface 140 transfers the cache status 604 and storing status 606 to the cache coherence control circuit 145 via the signal line 175. The cache coherence control circuit 145 transfers the cache status 604 to the CPU bus interface via the signal line 173.

The cache coherence control circuit 145 sends a request to the block information control circuit 160 via the signal line 176 to make the circuit 160 register the status Valid of the block corresponding to the address "A" in the block information memory 161.

If the entry status corresponding to the address "A" in the block information memory 161 is Invalid, the block information control circuit 160 changes the entry status to Valid.

If the cache status is a status Modified, the network interface 140 transfers the data 610a–610d of the received RD cache coherence control response transaction to the CPU bus interface via the signal line 171. If the cache status is a status other than the status Modified, the network interface 140 transfers the data 610a–610d of the received RD access response transaction to the CPU bus interface via the signal line 171.

(15) Return of Memory Read Result to Requesting CPU

If the cache status is a status Retry, the CPU bus interface 130 retries the transaction.

If the cache status is a status other than the status Retry, the CPU bus interface 130 sends the accessed and read data to the CPU bus 115 to respond to the memory read.

In this case, if the cache status is the status Invalid, the status of the block in the internal cache 111a of CPU is set to Exclusive.

If the cache status is the status Shared, the status of the block in the internal cache of CPU is set to Shared.

(Memory Read & Invalidate by CPU)

(1) Issuance of Memory Read & Invalidate (RI) Transaction by CPU

When CPU (e.g., CPU 110a) executes a memory read instruction for the address "A", CPU checks whether the block corresponding to the address "A" exists in the internal cache 111a.

If the block in the status Exclusive or Modified exists in the internal cache 111a, data is written in the entry in which the block is stored (termination).

If the block does not exists in the internal cache 111a or if the block is in the status Shared although its exists, CPU 110a issues an RI transaction for the address "A" to the CPU bus 115.

(2) Cache Coherence Control on CPU Bus

Upon reception of the RI transaction for the address "A", CPU 110b connected to the same CPU bus 115 as CPU 110a performs the cache coherence control for the internal cache 111b in the following manner.

(2-1) If CPU 110b does not store the block corresponding to the address "A":

then the processor 110b returns a cache status Invalid to the CPU bus 115.

(2-2) If CPU 110b stores the block corresponding to the address "A" in the status Shared or Exclusive:

then CPU 110b returns a cache status Invalid to the CPU bus 115.

Thereafter, the block status is changed to the status Invalid.

(2-3) If CPU 110b stores the block corresponding to the address "A" in a status Modified:

then CPU 110b returns a cache status Modified to the CPU bus 115.

In addition, by using the WB transaction, the cache block is returned and the status of the block is changed to Invalid.

Upon reception of a notice of the Modified status from the CPU bus 115, CPU 110a receives the WB transaction issued by CPU 110b, writes the target access block in the internal cache 111a.

Thereafter, data write regarding the memory write instruction is performed on the internal cache 111a, and the cache status is set to a status Modified (termination, the WB transaction process is, however, performed).

(3) Hit Check of Access Right Memory and Block Information Memory

The CPU bus interface 130 receives the RI transaction (1) or the cache status response and/or WB transaction (2-1)–(2-3).

The CPU bus interface 130 transfers the RI transaction and cache status response to the cache coherence control circuit 145 via the signal line 172.

Upon reception of the RI transaction (1), the cache coherence control circuit 145 sends a hit check request to the access control circuit 150 via the signal line 178 in order to make the circuit 150 check whether the access right to the extended block (EB) including the block corresponding to the address "A" is registered in the access right memory 151.

Upon reception of the hit check request, the access right control circuit 150 reads an entry (T1a) corresponding to the row address field 521 (A1*a*) of the address "A" from the access right memory 151.

Of the two ways of T1*a,* the way (Wa) having the tag 532*a,* 532*b* coincident with the tag field 522 (At*a*) of the address "A" is searched.

If Wa does not exist, the way is determined to be stored in which is the access right to the extended block including the target memory read block corresponding to the address "A", and this way is used as Wa.

The method of determining the way is as follows:

If the way having the status 00b (an indefinite access right) exists, this way is used.

If the way having the status 00b (an indefinite access right) does not exist, the way 1 is used if the LRU bit 531 of the entry (T1*a*) of the access right memory 151 is "0", whereas the way 0 is used if it is "1".

In this case, the status of the way to be used is set to 00b (an indefinite access right), and the LRU bit 531 is inverted.

Thereafter, the access control circuit 150 sets the access right to Wa in use until the transaction is completed, and makes a transaction from its and other CPU's to be retried.

When the access right status of the target extended block is read from the access right memory 151, the access right control circuit 150 transfers the access right status to the cache coherence control circuit 145 via the signal line 179.

The cache coherence control circuit also sends a request to the block information control circuit 160 via the signal line 176 to make the circuit 160 register the entry of the block corresponding to the address "A" in the block information memory 161.

Upon reception of this block registration request, the block information control circuit 160 accesses the block information memory 161 to check whether the block corresponding to the address "A" is registered.

If not registered, a new entry is added and the status is set to Invalid.

(4) Issuance of Memory Read Request & Invalidate Request Transaction to Memory

The cache coherence control circuit 145 sends the address "A", read & invalidate request and access right status to the network interface 140 via the signal line 174 to thereby instruct to issue an RI request transaction.

The network interface 140 issues the RI request transaction (Tri) to the network 400 via the signal line 185.

The RI request transaction Tri is a transaction which stores: the number of its CPU node 100*a* in the issuing node 600 shown in FIG. 6; an identifier of the transaction determined by the network interface 140 in the issuing side identifier 601; one of 000b (access request with cache coherence control and extended block status check), 001b (access request with cache coherence control) and 111b (access request without cache coherence control) in the processing status 602; 01b (RI) in the instruction type 603; and the address "A" in the target address 605.

The processing status 602 is determined by the result of the hit check (3). Namely, the processing status 602 is set to 111b (access request without cache coherence control) if the access right status of the extended block corresponding to the address "A" is "with an access right", to 001b (access request with cache coherence control) if "without an access right, or to 000b (access request with cache coherence control and extended block storing status check) if" an indefinite access right.

(5) Transfer of Memory Read & Invalidate Transaction from Network

The network 400 acquires a target memory node (e.g., 200*a*) from the upper three bits of the target address 605 of the DI request transaction Tri, and transfers Tri to the target memory node 200*a*.

If the processing status 602 of Trd is the access request with the cache coherence control and extended block storing status check, the processing status 602 of Tri is changed to the access request with the cache coherence control and extended block storing status check, and Tri is transferred to all CPU nodes excepting the issuing CPU node.

If the processing status 602 of Tri is the access request with the cache coherence control, the processing status 602 of Tri is changed to the access request with the cache coherence control, and Tri is transferred to all CPU nodes excepting the issuing CPU node.

If the processing status 602 of the RI request transaction Tri is the access request without the cache coherence control, the process advances to (12), whereas if not, the process advances to (6).

(6) Reception of Cache Coherence Control and Extended Block Storing Status Check Request, or Cache Coherence Control Request at Other CPU's If the requesting CPU node issues the access request with the cache coherence control and extended block storing status check in the process (4), the network interface 140 of another CPU node 100*a*–100*b* receives an RI cache coherence control and extended block storing status check request transaction from the network 400.

If the requesting CPU node issues the access request with the cache coherence control in the process (4), the network interface 140 of another CPU node 100*a*–100*b* receives an RI cache coherence control request transaction from the network 400.

The network interface 140 transfers the type of the transaction and the address "A" received from the signal line 175 to the cache coherence control circuit 145, and instructs the cache coherence control circuit 145 to execute an RI cache coherence control and extended block storing status check process, or an RI cache coherence control.

In the following (7) to (11), each of the case that a CPU node receives the RI cache coherence control and extended block storing status check process and the case that a CPU node receives the RI cache coherence control, will be described divisionally.

(Reception of RI Cache Coherence Control and Extended Block Storing Status Check Process)

(7) Check of Access Right Memory at Other CPU's

The cache coherence control circuit 145 sends a request to the access right control circuit 150 via the signal line 178 to make the circuit 150 perform a hit check of the access right memory 151 relative to the extended block EB including the block corresponding to the address "A", in a manner similar to the process (3).

(7-1) If the access right entry corresponding to EB is registered in the access right memory 151 and the corresponding CPU node issued a memory access using this access right, then the access right control circuit 150 returns an access right status Retry (instruction to issue the transaction again) to the cache coherence control circuit 145 via the signal line 179.

(7-2) If the access right entry corresponding to EB is registered in the access right memory 151 and the corresponding CPU node did not issue a memory access using this access right, then the access right control circuit 150 sets the access right entry in use until the status of the access right entry is updated, makes a transaction from its and other CPU's using this entry to be retried.

The access right status Retry for the entry is returned to the cache coherence control circuit 145.

(7-3) If the access right entry corresponding to EB is not stored in the access right memory 151, "an indefinite access right is returned to the cache coherence control circuit 145 as the access right status.

(8) Cache Coherence Control at CPU's of Other CPU Nodes

If the access right status acquired by the check process (7) for the access right memory is not Retry, the cache coherence control circuit 145 issues an RI cache coherence control request to the CPU bus interface 130 via the signal line 173.

Upon reception of the RI cache coherence control request, the CPU bus interface 130 issues an RI transaction to the CPU bus 115 in order to perform the cache coherence control at CPU's of the CPU node.

CPU 110a, 110b connected to the CPU bus 115 executes an RI cache coherence control.

Specifically, CPU having the Modified block corresponding to the address "A" returns the cache status Modified, and transfers the Modified block to the CPU bus interface 130 via the CPU bus 115 by using a WB transaction.

CPU having the block corresponding to the address "A" in the status Exclusive or Shared changes the cache status of the block corresponding to the address "A" to the status Invalid and returns the cache status Invalid.

CPU 130 having no block at the address "A" returns the cache status Invalid.

The CPU bus interface 130 receives the cache status from the CPU bus 115, and transfers it to the cache coherence control circuit 145 via the signal line 172.

When the WB transaction is received, the Modified block is transferred to the network interface via the signal line 170.

The cache coherence control circuit 145 determines the cache status of a block corresponding to the address "A" at the node as in the following.

If the access right status is Retry, the cache status at the node is set to Retry.

If the access right status is a status other than the status Retry, the cache status of CPU is used as the cache status of the node.

(9) Extended Block Storing Status Check at Other CPU Nodes

The cache coherence control circuit 145 sends an invalidating request for the block corresponding to the address "A" to the block information control circuit 160 via the signal line 176 signal in order to invalidate the block corresponding to the address "A" registered in the block information memory 161.

The cache coherence control circuit 145 also sends an extended block storing status check request to the block information control circuit 160 via the signal line 176 to make the circuit 160 check whether each block in the extended block corresponding to the address "A" is registered in the block information memory 161 of its CPU node.

The block information control circuit 160 performs the extended block storing status check by the following procedure.

The block information control circuit 160 checks whether addresses B, C and D of the blocks of the extended block corresponding to the address "A" are registered in the block information memory 161.

If the entries corresponding to the addresses B, C and D are registered in the block information memory 161 and if there is even one status Valid, then the block information control circuit 160 judges that the extended block is stored by the node, and returns the storing status "1" to the cache coherence control circuit 145 via the signal line 176.

If none of the entries corresponding to the addresses B, C and D are registered in the block information memory 161 or if the entries registered have all the Invalid status, then the block information control circuit 160 judges that the extended block is not stored by the node and returns a non-storing status "0" to the cache coherence control circuit 145 via the signal line 176.

(10) Update of Access Right Memory by Other CPU Nodes

When the cache coherence control circuit 145 receives the access right status from the access right control circuit 150 as the result of the process (7), the block status from the CPU bus interface as the result of the process (8) and the extended block storing status check result from the block information control circuit 160 as the result of the process (9), the cache coherence control circuit 145 makes the access right control circuit 150 update the access right status of the extended block corresponding to the address "A".

If the access right status is "with an access right" and the extended block storing status check result is a storing status, then the access right is changed to "without an access right".

If the access right status is "with an access right" and the extended block storing status check result is a non-storing status, then the access right is changed to "an indefinite access right".

If the access right status is "without an access right" and the extended block storing status check result is a non-storing status, then the access right is changed to "an indefinite access right".

Then, the access right entry for the extended block is made not in use.

When the access right memory is updated, the cache coherence control circuit 145 transfers the cache status and the extended block storing status check result to the network interface 140 via the signal line 174.

(11) Return of Cache Coherence Control Result and Extended Block Storing Status Check Result from Other Nodes The network interface 140 executes the following processes in accordance with the block status received from the cache coherence control circuit 145.

(11-1) For the block status Modified

The network interface 140 transfers the Modified block to the network 400 by using an RI cache coherence control and extended block storing status check response transaction.

The RI cache coherence control and extended block storing status check response transaction used is a transaction which stores: a cache coherence control and extended block storing status check response in the processing status 602 of the RI cache coherence control and extended block storing status check request transaction; a status Modified in the cache status 604; and the Modified block divided into four parts in the data field 610a to 610d.

(11-2) For the block status other then Modified

The network interface 140 transfers the RI cache coherence control and extended block storing status check response transaction to the network 400.

The RI cache coherence control and extended block storing status check response transaction used is a transaction which stores: a cache coherence control and extended block storing status check response in the processing status 602 of the RI cache coherence control and extended block storing status check request transaction; and a status Invalid in the cache status 604.

(Reception of RI Cache Coherence Control)

(7) Check of Access Right Memory at Other CPU's

This process is not executed if the request is the RI cache coherence control.

(8) Cache Coherence Control at CPU's of Other CPU Nodes

The cache coherence control circuit 145 issues an RI cache coherence control request to the CPU bus interface 130 via the signal line 173.

Upon reception of the RI cache coherence control request, the CPU bus interface 130 issues an RI transaction to the CPU bus 115 in order to perform the cache coherence control at CPU's of the CPU node.

CPU 110*a*, 110*b* connected to the CPU bus 115 executes an RI cache coherence control.

Specifically, CPU having the Modified block corresponding to the address "A" returns the cache status Modified, and transfers the Modified block to the CPU bus interface 130 via the CPU bus 115 by using a WB transaction.

CPU having the block corresponding to the address "A" in the status Exclusive or Shared changes the cache status of the block corresponding to the address "A" to the status Invalid and returns the cache status Invalid.

CPU 130 having no block at the address "A" returns the cache status Invalid.

The CPU bus interface 130 receives the cache status from the CPU bus 115, and transfers it to the cache coherence control circuit 145 via the signal line 172.

When the WB transaction is received, the Modified block is transferred to the network interface via the signal line 171.

The cache coherence control circuit 145 uses the cache status of CPU as the cache status of the node.

(9) Extended Block Storing Status Check at Other CPU Nodes

The cache coherence control circuit 145 sends an invalidating request for the block corresponding to the address "A" to the block information control circuit 160 via the signal line 176 signal in order to invalidate the block corresponding to the address "A" registered in the block information memory 161.

If the request is the RI cache coherence control, the extended block storing status check is not performed.

(10) Update of Access Right Memory by Other CPU Nodes

If the request is the RI cache coherence control, the access right memory is not updated.

The cache coherence control circuit 145 transfers the block status to the network interface via the signal line 174.

(11) Return of Cache Coherence Control Result and Extended Block Storing Status Check Result from Other Nodes The network interface 140 executes the following processes in accordance with the block status received from the cache coherence control circuit 145.

(11-1) For the block status Modified

The network interface 140 transfers the Modified block to the network 400 by using an RI cache coherence control response transaction.

The RI cache coherence control response transaction used is a transaction which stores: a cache coherence control response in the processing status 602 of the RI cache coherence control request transaction; a status Modified in the cache status 604; and the Modified block divided into four parts in the data field 610*a*–610*d*.

(11-2) For the block status other then Modified

The network interface 140 transfers the RI cache coherence control response transaction to the network 400.

The RI cache coherence control response transaction used is a transaction which stores: a cache coherence control response in the processing status 602 of the RI cache coherence control request transaction; and a status Invalid in the cache status 604.

(12) Return of Memory Data from Memory Node

Upon reception of the RI access request transaction (without cache coherence control, with cache coherence control and extended block storing status check, with cache coherence control) from the network 400 by the process (5), the target memory node 200*a* reads the block corresponding to the address "A", and returns an RI access response transaction to the network 400.

The RI access response transaction is a transaction which stores an access response in the processing status 602 of the RI access request transaction and the read block in the data fields 610*a*–610*d*.

(13) Return of Cache Coherence Control Result and Memory Data by Network

The network 400 executes the following processes in accordance with the type of a received response transaction.

(13-1) Upon reception of the RI access response transaction from the target memory node, the network 400 transfers it to the issuing CPU node of the request transaction designated by the issuing node 600 of the request transaction.

(13-2) When the RI cache coherence control and extended block storing status check response transaction is received from all CPU nodes, these transactions are handled in the following manner, and a new RI cache coherence control and extended block storing status check response transaction is generated and returned to the issuing CPU node of the request transaction designated by the issuing node 600.

If there is a transaction having the status Retry as the cache status 604, this transaction is used as the RI cache coherence control and extended block storing status check response transaction.

If there are transactions having the status Modified as the cache status 604, these transactions are selected. If there is a transaction whose storing status 606 is a storing status, the storing status 606 of the selected transaction is set to a storing status, whereas if there are transactions whose storing statuses are a non-storing status, the storing status 606 of the selected transaction is set to a non-storing status. The selected and set transaction is used as the RI cache coherence control and extended block storing status check response transaction.

In other cases, one of the received transactions is selected, and the cache status 604 thereof is set to Invalid. If there is a transaction whose storing status 606 is a storing status, the storing status 606 of the selected transaction is set to a storing status, whereas if there are transactions whose storing statuses are a non-storing status, the storing status 606 of the selected transaction is set to a non-storing status. The selected and set transaction is used as the RI cache coherence control and extended block storing status check response transaction.

(13-3) When the RI cache coherence control response transaction is received from all CPU nodes, these transactions are handled in the following manner, and a new RI cache coherence control response transaction is generated and returned to the issuing CPU node of the request transaction designated by the issuing node 600.

If there is a transaction having the status Retry as the cache status 604, this transaction is used as the RI cache coherence control response transaction.

If there is a transaction having the status Modified as the cache status 604, this transaction is used as the RI cache coherence control response transaction.

In other cases, one of the received transactions is selected, and used as the RI cache coherence control and extended block storing status check response transaction.

(14) Update of Access Right and Block Information

The network interface 140 of the requesting CPU node receives and processes the response transaction in accordance with the type of the issued request transaction in the following manner.

(14-1) If the request transaction is an access transaction without an RI cache coherence control, the network interface 140 of the transaction issuing CPU node 100a receives the RI access response transaction and transfers the transaction data 610a–610d to the CPU bus interface 130 via the signal line 171.

(14-2) If the request transaction is an access request transaction with the RI cache coherence control and extended block storing status check request, the network interface 140 of the transaction issuing CPU node 100a receives the RI access response transaction and the RI cache coherence control and extended block storing status check response transaction.

The network interface 140 transfers the cache status 604 and storing status 606 to the cache coherence control circuit 145 via the signal line 175.

The cache coherence control circuit 145 transfers the cache status 604 to the CPU bus interface via the signal line 173.

If the cache status is a status other than the status Retry, the cache coherence control circuit 145 registers the access right status of the extended block including the block corresponding to the address "A" in Wa of the access right memory 151.

In this case, if the storing status (extended block storing status check result) is a storing status, the access right status of the access right entry to be registered is set to "without an access right", whereas if the storing status is a non-storing status, the access right status of the access right entry to be registered is set to "with an access right". Then, Wa is set not in use.

The cache coherence control circuit 145 sends a request to the block information control circuit 160 via the signal line 176 to make the circuit 160 register the status Valid of the block corresponding to the address "A" in the block information memory 161.

If the entry status corresponding to the address "A" in the block information memory 161 is Invalid, the block information control circuit 160 changes the entry status to Valid.

If the cache status is a status Modified, the network interface 140 transfers the data 610a–610d of the received RI cache coherence control and extended block storing status check response transaction to the CPU bus interface via the signal line 171.

If the cache status is a status Invalid, the network interface 140 transfers the data 610a–610d of the received RI access response transaction to the CPU bus interface via the signal line 171.

(14-3) If the request transaction is an access request transaction with the RI cache coherence control, the network interface 140 of the transaction issuing CPU node 100a receives the RI access response transaction and the RI cache coherence control response transaction.

The network interface 140 transfers the cache status 604 and storing status 606 to the cache coherence control circuit 145 via the signal line 175.

The cache coherence control circuit 145 transfers the cache status 604 to the CPU bus interface via the signal line 173.

The cache coherence control circuit 145 sends a request to the block information control circuit 160 via the signal line 176 to make the circuit 160 register the status Valid of the block corresponding to the address "A" in the block information memory 161.

If the entry status corresponding to the address "A" in the block information memory 161 is Invalid, the block information control circuit 160 changes the entry status to Valid.

If the cache status is a status Modified, the network interface 140 transfers the data 610a–610d of the received RI cache coherence control response transaction to the CPU bus interface via the signal line 171.

If the cache status is a status Invalid, the network interface 140 transfers the data 610a–610d of the received RI access response transaction to the CPU bus interface via the signal line 171.

(15) Return of Memory Read Result to Requesting CPU

If the cache status is a status other then the status Retry, the CPU bus interface 130 sends the accessed and read data to the CPU bus 115 to respond to the memory read & invalidate.

In this case, the status of the block in the internal cache 111a of CPU is set to Exclusive.

If the cache status is the status Retry, the (Memory Write Back by CPU)

(1) Issuance of Memory Write Back Transaction by CPU

CPU (e.g., 110a) replaces the internal cache 111a, and issues a WB transaction for the target replacement block to the CPU bus 115.

(2) Cache Coherence Control on CPU bus

A target of the WB transaction is a block in the status Modified stored in the internal cache 111a and the other CPU 110b does not store this block.

(3) Reception of Memory Write Back Transaction by Network Interface

The CPU bus interface 130 receives the WB transaction issued at the process (1) via the CPU bus 115, and transfers the type (WB) of the transaction and a target address "A" to the cache coherence control circuit 145 via the signal line 172.

The cache coherence control circuit 145 transfers the type of the transaction and the target address "A" to the network interface 140 via the signal line 174, and makes the block information control circuit 160 set the status of the address "A" registered in the block information memory 161 to a status Invalid.

The CPU bus interface 130 transfers the data of the WB transaction issued at the process (1) to the network interface 140 via the signal line 170.

(4) Issuance of WB Request Transaction to Network

The network interface 140 issues a WB request transaction to the network 400 via the signal line 185.

The WB request transaction is a transaction which stores: the number of its CPU node in the issuing node 600 shown in FIG. 6; an identifier of the transaction determined by the network interface 140 in the issuing side identifier 601; an access request (110b) in the processing type 603; the address "A" in the target address 605; and the target write-back block received from the CPU bus interface 130 via the signal line 170 in the data word 0th to 3rd fields 610a–610d.

(5) Transfer WB Request Transaction by Network

The network 400 acquires the target memory node (e.g., 200a) from the upper three bits of the target address 605 of the transaction, and transfers the WB request transaction to the target memory node 200.

(6) Write-back Process by Memory Node

Upon reception of the WB request transaction from the network at the process (5), the memory node 200a writes the data 0th to 3rd words at the address "A".

The first embodiment of the invention has been described above.

As seen from the above description, if CPU has an access right (in the status of "with an access right") to the extended block including the target access block, a memory access can be performed without the cache coherence control at other nodes. It is therefore possible to reduce the traffics of transactions transferred via the network and to lower the occurrence frequency of the cache coherence control at each CPU node.

It is generally known that in a business application, although a rate of accessing again a block once accessed by a CPU is not so large (a block re-access rate), an access occurs for several consecutive blocks (access continuity).

Therefore, if the access right is managed in the block unit, a rate of accessing again a block once accessed is low irrespective of having had the access right to this block. Therefore, the effects of lowering the occurrence frequency of the cache coherence control are degraded.

However, according to the invention, the access right is made broader than the block size. An access request issued to one block is given an access right to the extended block including the accessed block. Therefore, even when another block included in the same extended block is accessed, the access right is already present so that memory access becomes possible without the cache coherence control at other nodes.

The effects of lowering the occurrence frequency of the cache coherence control in the network can be improved considerably.

Even if a program is executed which has neither the block re-use performance nor the access continuity, the operation of the cache coherence control apparatus of the embodiment is the same as that of a conventional apparatus. It is therefore ensured that the occurrence frequency of the cache coherence control does not increase more than a conventional apparatus.

<Second Embodiment>

The second embodiment is a modification of the first embodiment, and so only different points from the first embodiment will be described.

Figure 7:
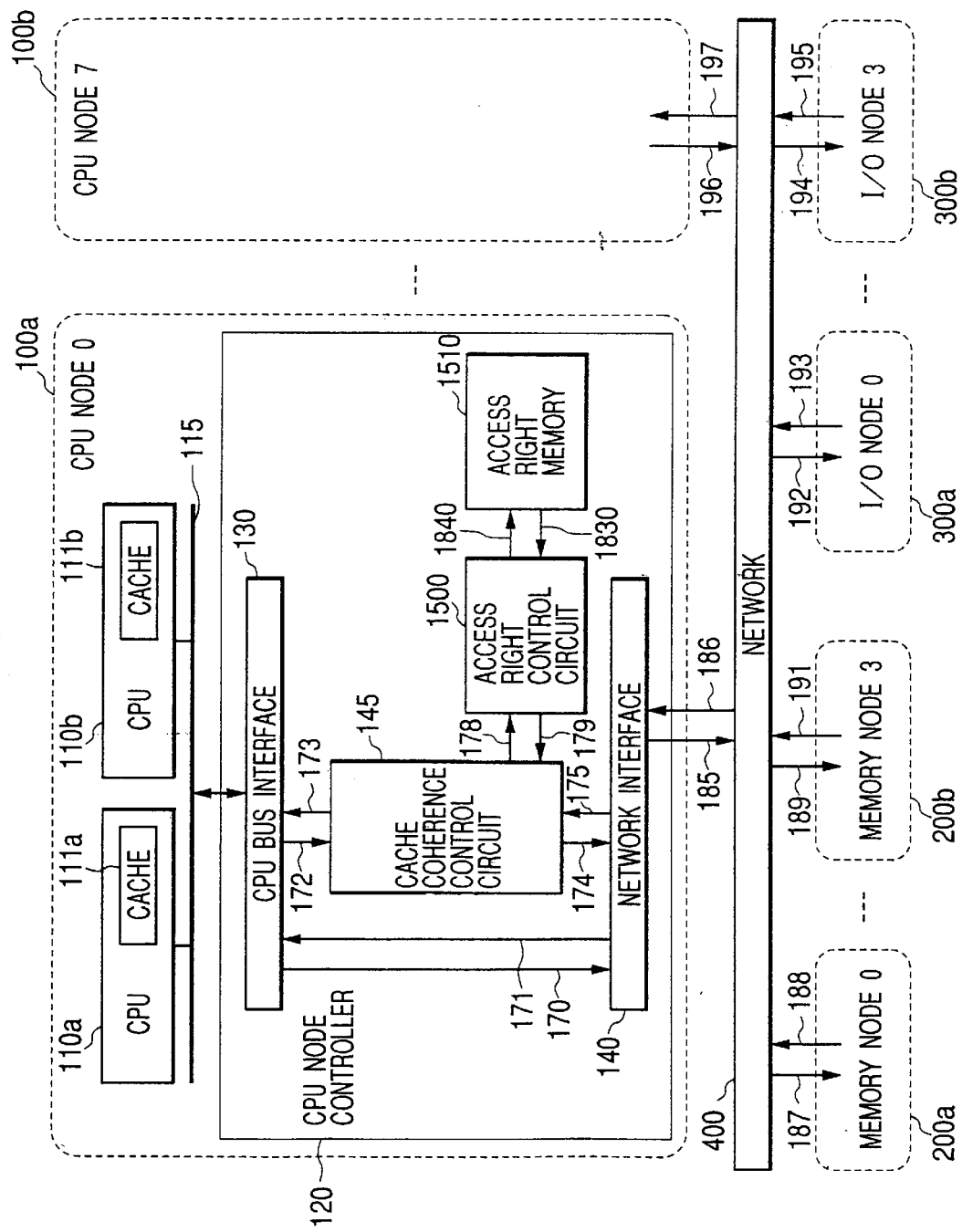
FIG. 7 is a diagram showing the structure of a parallel computer having a plurality of nodes interconnected by a network and equipped with a cache coherence control system according to a second embodiment of the invention.

The structure of the second embodiment is shown in FIG. 7.

In the second embodiment, the block information memory 161 of the constituent element of the first embodiment shown in FIG. 1 is integrated with the access right memory 151 shown in FIG. 1 to form a new access right memory 1510 (FIG. 7), and the block information control circuit 160 shown in FIG. 1 is integrated with the access right control circuit 150 shown in FIG. 1 to form a new access right control circuit 1500 (FIG. 7).

The access right memory 1510 and access right control circuit 1500 are interconnected by signal lines 1830 and 1840.

The access right control circuit 1500 is connected via the signal lines 178 and 179 to the cache coherence control circuit 145.

The access right memory 1510 is a memory for storing: the access rights of extended blocks of the CPU node having the access right memory 1510; and information of the blocks having a possibility of being cached by the CPU node.

Figure 8:
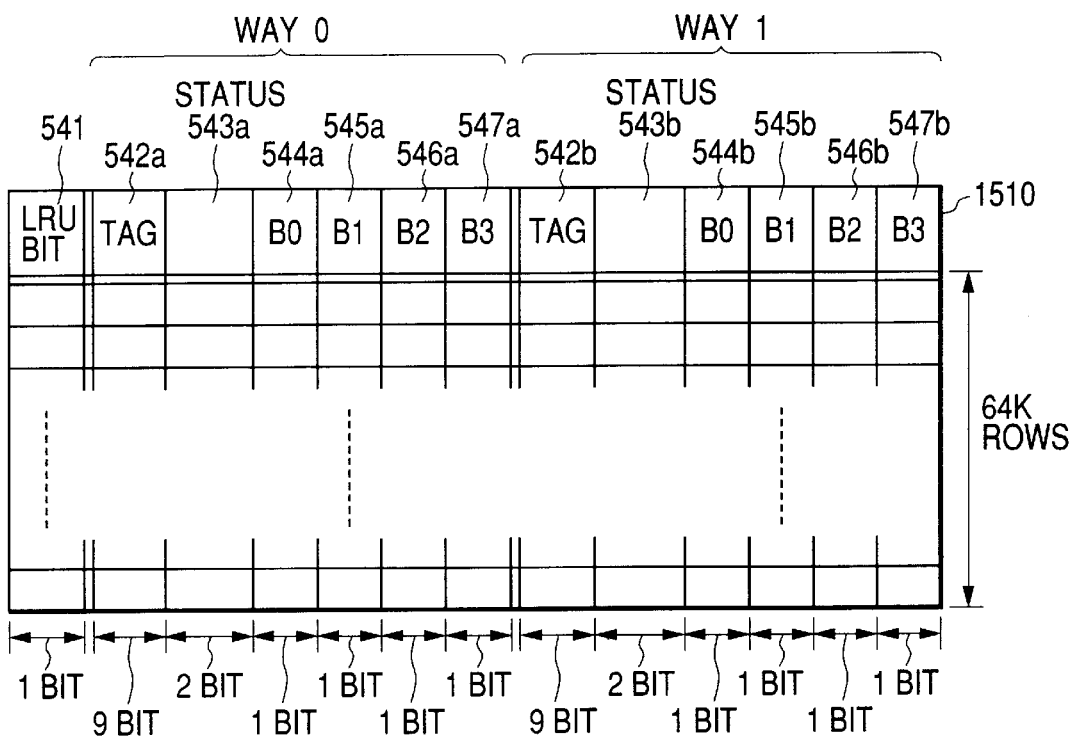
FIG. 8 is a diagram showing the structure of an access right memory of the second embodiment.

The access right memory 1510 has the structure shown in FIG. 8.

Each slot is constituted of an LRU bit 541, information of a way 0 and information of a way 1.

The number of rows of the access right memory 1510 is 64K.

The LRU bit 541, tags 542a and 542b, statuses 543a and 543b are the same as the LRU bit 531, tags 532a and 532b, statuses 533a and 533b respectively of the access right memory 151 (FIG. 5) of the first embodiment.

Each of block information B0–B3 (544a–547a, 544b–547b) has one bit of either Valid "1" or Invalid "0". This bit indicates whether each of the 0th to 3rd blocks in the extended block is stored in the internal cache of the CPU node.

Namely, if the block information Bi in some entry of the access right memory 1510 is "1" (Valid), then there is a possibility that the i-th block in the extended block corresponding to the access right entry is stored in the internal caches of CPU's of the CPU node.

In the transaction process of the second embodiment, reference, registration and status update processes for the block information memory 161 under the control of the block information control circuit 160 of the first embodiment are replaced by reference, registration and status update processes for the block information B0 to B3 in the access right memory 1510 under the control of the access right control circuit 1510.

From this reason, the description is directed to only the reference, registration and status update processes for the block information B0–B3 in the access right memory 1510 under the control of the access right control circuit 1510.

(Reference to Block Information in Access Right Memory)

In judging whether a block B1 corresponding to a target access address "A" is registered in the access right memory 1510, the entries of the access right memory 1510 at the row address 521 (FIG. 4) represented by the address "A" are read.

The tag field 522 of the address "A" is compared with the tags 532a and 532b of the read two entries, way 0 and way 1. If both the tags are mismatched, it is judged that the block is not registered in the access right memory 1510.

If one of the tags is matched, the access right entry of this way is an entry of the extended memory corresponding to the address "A".

Of the block information B0–B3 of the access right entry, the block information Ni corresponding to the block number i represented by the block identifier 523 (FIG. 4) of the address "A" is acquired. If i is "1" (Valid), it is judged that the block is registered in the access right memory 1510, whereas if not, it is judged that the block is not registered in the access right memory 1510.

(Registration of Block Information in Access Right Memory)

In registering the block B1 corresponding to the address "A", it is checked whether the extended block including the block B1 is registered in the access right memory 1510.

Specifically, access right entries of the access right memory 1510 at the row address 521 (FIG. 4) represented by the address "A" are read. The tag field 522 of the address "A" is compared with the tags 542a and 542b of the read two entries, way 0 and way 1. In accordance with the comparison result, the following processes are executed.

If the tag matches one of the access right entries, of the block information B0–B3 (544a–547a, 544b–547b) of the access right entry, the block information Bi corresponding to the block number i represented by the block identifier 523 (FIG. 4) of the address "A" is changed to Valid "1".

If the tag matches none of the access right entries, the access right entry corresponding to the extended block including the block B is newly registered in the access right memory 1510.

The process of registering an access right entry is assumed to be the same as that described with the first embodiment.

The status of the registered access right entry is set to "an indefinite access right".

Of the block information B0–B3 (544a–547a, 544b–547b) of the newly added access right entry, the block information Bi corresponding to the block number i represented by the block identifier 523 (FIG. 4) of the address "A" is set to Valid "1", and the statuses of the other blocks are set to Invalid "0".

If an access right entry is newly added and the previously stored access right entry is replaced, of the block information B0–B3 of the replaced access right entry, the block having the status Valid is replaced from the internal cache of each CPU of the CPU node having the access right memory.

A replacement process is executed in a manner similar to the first embodiment.

(Update of Block Information of Access Right Memory)

In updating the status of the block B1 corresponding to the target address "A", the entries registered in the access right memory 1510 at the row address 521 (FIG. 4) represented by the address "A" are read. The tag field 522 of the address "A" is compared with the tags 542a and 542b of the read two entries, way 0 and way 1. A new status is written in the access right entry of the matched way in the block information Bi of the block represented by the block identifier 523 of the address "A".

In this embodiment, the block information memory of the first embodiment is integrated with the access right memory so that the LRU (1 bit) and tags (11 bits) multiplied by "2" of the block information memory can be reduced and the memory capacity of the CPU node control circuit can be reduced.

The effects of reducing cache coherence control transactions are approximately similar to the first embodiment. However, since the block information memory is integrated with the access right memory, the number of registerable blocks is limited and replacement of lines stored in the internal cache of CPU occurs more than the first embodiment.

<Third Embodiment>

The third embodiment is a modification of the first embodiment, and so only different points from the first embodiment will be described.

Figure 10:
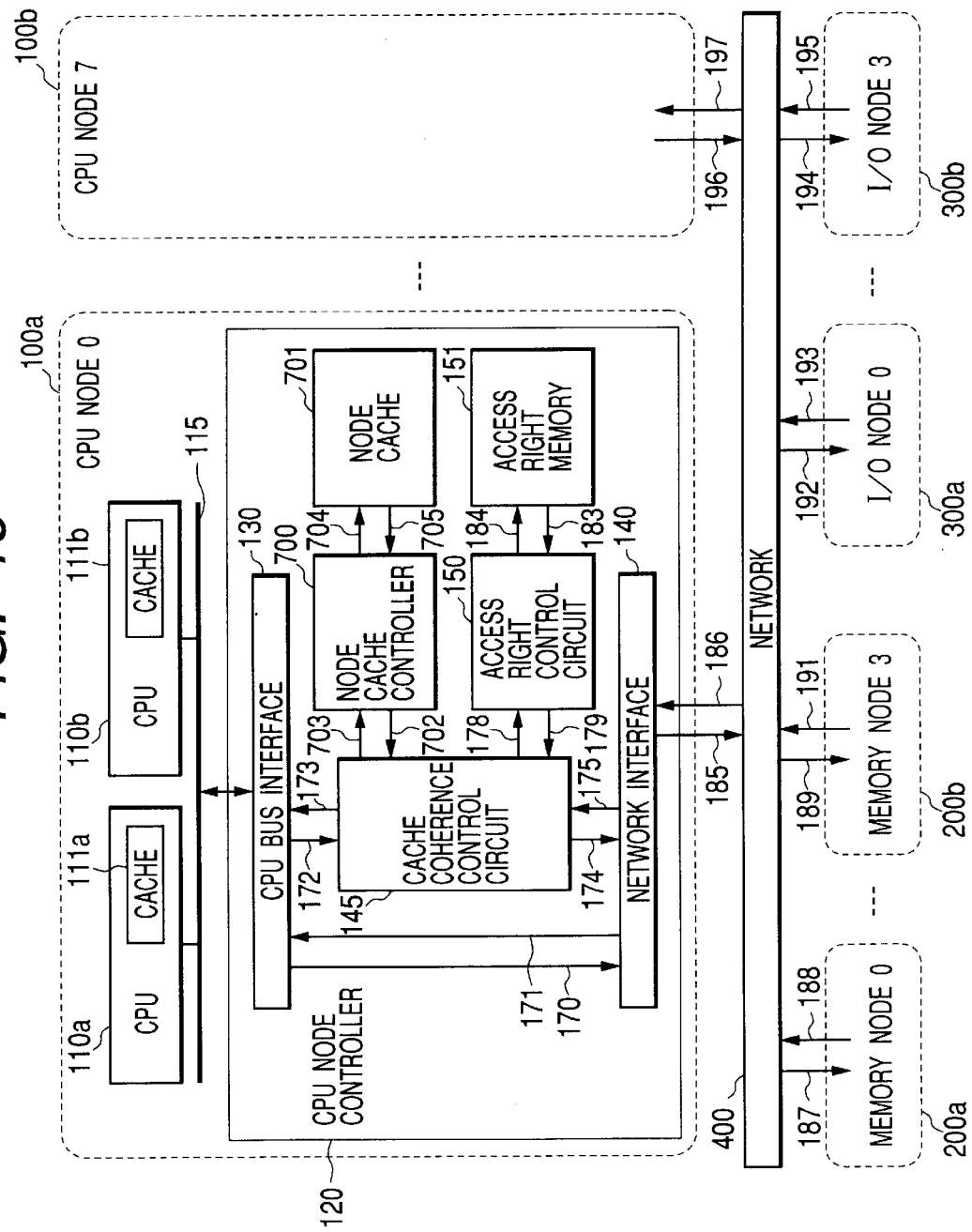
FIG. 10 is a diagram showing the structure of a parallel computer having a plurality of nodes interconnected by a network and equipped with a cache coherence control system according to the third embodiment of the invention.

The structure of the third embodiment is shown in FIG. 10.

In the third embodiment, the block information memory 161 (FIG. 1) of the first embodiment is replaced by a node cache 701, and the block information control circuit 160 (FIG. 1) is replaced by a node cache control circuit 700.

The node cache 701 and node cache control circuit 700 are interconnected by signal lines 704 and 705, and the node cache control circuit 700 is connected via signal lines 702 and 703 to the cache coherence control circuit 145.

In the first embodiment, information of blocks stored in the internal caches 111a and 111b of CPU's 110a and 110b is registered in the block information memory 161. When an extended block storing status check request is received from other CPU's, by referring to the block information memory 161 it is judged whether the access right to the extended block can be acquired.

In this embodiment, blocks themselves stored in the internal caches 111a and 111b of CPU's 110a and 110b are also registered in the node cache 701. When an extended block storing status check request is received from another CPU, by referring to the node cache 701, it is judged whether the access right to the extended block can be acquired.

For a memory access by CPU 110a, 110b, if a target block is not registered in the internal cache 111a, 111b, then the CPU node accesses the node cache 702, and if the target block is registered therein, transfers it to CPU.

If the target block is not registered in the node cache, an entry corresponding to the extended memory including the target block is read from the access right memory. In accordance with the access right status of the entry, a memory access transaction is issued to the network 400 to read the block from the target memory node.

Figure 9:
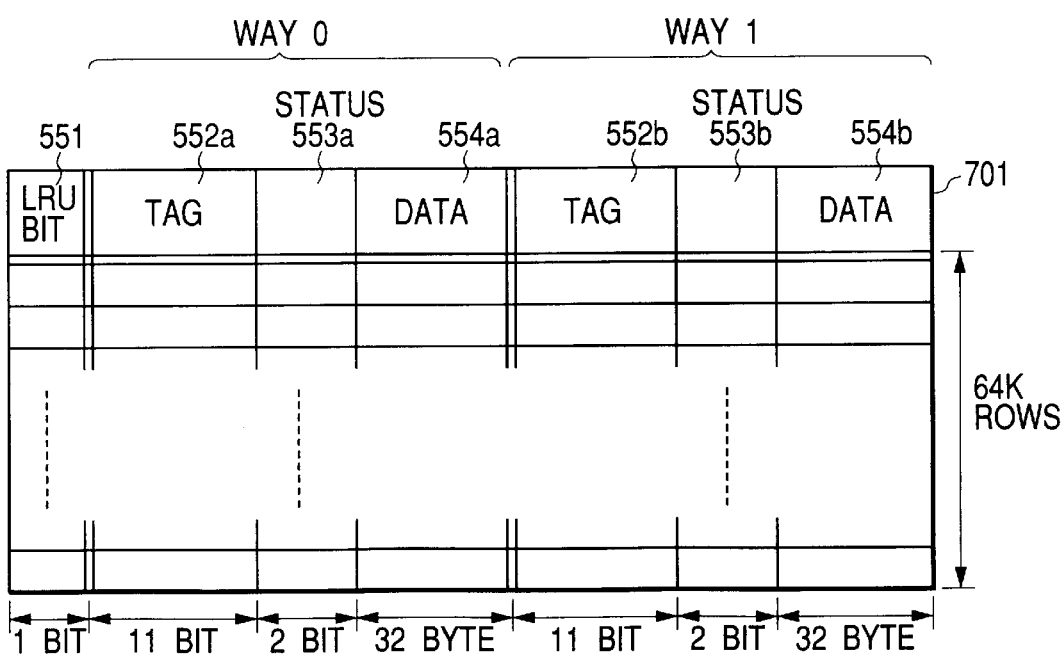
FIG. 9 is a diagram showing the structure of a node cache according to a third embodiment of the invention.

The structure of the node cache 701 is shown in FIG. 9.

Each slot of the node cache 701 is constituted of an LRU bit 551, information of a way 0 and information of a way 1.

The number of rows of the node cache 701 is 64K.

Each way is constituted of a tag 552a, 552b, a status 553a, 553b, and data 554a, 554b.

The LRU bit 551 and tags 552a and 552b are the same as the LRU bit 511, tags 512a and 512b of the block information memory 161 of the first embodiment.

The statuses 553a and 553b of the node cache 701 indicate the block statuses which include statuses Modified, Exclusive, Shared and Invalid which are managed by the MESI protocol like CPU 110a, 111b.

In the following, different points of the transaction process of this embodiment from that of the first embodiment will be described.

(Transaction Process)
(Memory Read by CPU)

The processes (1), (2), (4) to (7), (10) to (13) and (15) are the same as those of the first embodiment.

In the process (10), however, the block information control circuit 160 is replaced by the node cache control circuit 700.

The processes of this embodiment corresponding to the processes (3), (8), (9) and (14) of the first embodiment are as follows.

(3) Hit Check of Node Cache and Access Right Memory

The CPU bus interface 130 receives the RD transaction (1) or the cache status response and/or WB transaction (2-1) to (2-3).

The CPU bus interface 130 transfers the RD request to the cache coherence control circuit 145 via the signal line 172.

Upon reception of the RD request, the cache coherence control circuit 145 sends a target access address "A" to the node cache control circuit 700 via the signal line 703 to make the circuit 700 perform a hit check & read of the node cache 701.

The node cache control circuit 700 searches the node cache 701 (the search method has been described above). In accordance with the search result, the following processes are executed.

If the block corresponding to the address "A" is registered (in an entry Na) and its status is a status other than the status Invalid, data in the entry Na (if the entry is the way 0, data 554a, whereas the entry is the way 1, data 554b) is read. The block status and data are transferred to the cache coherence control circuit 145 via the signal line 702.

If the block corresponding to the address "A" is registered (in an entry Na) and its status is the status Invalid, the status Invalid is transferred to the cache coherence control circuit 145 via the signal lines 702.

If the block corresponding to the address "A" is not registered, an entry (entry Na) of the block corresponding to the address "A" is held in the node cache 701, the status of the entry is set to Invalid, and the status Invalid is transferred to the cache coherence control circuit 145 via the signal line 702. The entry is made in use until data is stored in this entry at the process (14) to make an access to the block issued by its and other CPU nodes to be retried.

Upon reception of the cache status and data (no data for the status Invalid) from the node cache control circuit 700, the cache coherence control circuit 145 executes the following processes in accordance with the cache status.

If the cache status is a status other than the status Invalid, the cache coherence control circuit 145 sends the cache status and data to the CPU bus interface via the signal line 173 to thereafter skip to the process (15).

If the cache status is the status Invalid, the cache coherence control circuit 145 sends a hit check request to the access control circuit 150 via the signal line 178 to check whether the access right to the extended block (EB) including the block corresponding to the address "A" is registered in the access right memory 151.

Upon reception of the hit check request, the access right control circuit 150 reads the row (T1a) corresponding to the row address field 521 (A1a) of the address "A" from the access right memory 151.

Of the two ways of T1a, the way (Wa) having the tag 532a, 532b coincident with the tag field 522 (Ata) of the address "A" is searched.

If Wa does not exist, the way is determined to be stored in which is the access right to the extended block including the target memory read block corresponding to the address "A", and this way is used as Wa.

The method of determining the way is as follows:
If the way having the status 00b exists, this way is used.
If the way having the status 00b does not exist, the way 1 is used if the LRU bit 531 of the row (T1a) of the access right memory 151 is "0", whereas the way 0 is used if it is "1". In this case, the status of the way to be used is set to 00b and the LRU bit 531 is inverted.

Thereafter, the access control circuit 150 sets the access right to Wa in use until the transaction is completed, and makes a transaction from its and other CPU's to be retried.

When the access right status of the target extended block is read from the access right memory 151, the access right control circuit 150 transfers the access right status to the cache coherence control circuit 145 via the signal line 179.

The same process (8) is used both for (the reception of an RD cache coherence control and extended block storing status check process) and (the reception of an RD cache coherence control), as in the following.

(8) Cache Coherence Control at CPU's of Other CPU Nodes

If the access right status acquired by the check process (7) for the access right memory is Retry, the cache coherence control circuit 145 sets the cache status of its CPU node to the status Retry.

If the access right status is not Retry, the cache coherence control circuit 145 sends a request to the node cache circuit 700 via the signal line 703 to make the circuit 700 execute a cache coherence control of the node cache 701 for the block corresponding to the address "A".

The node cache control circuit 700 searches the node cache 701. If the entry of the block corresponding to the address exists and is in use, the node cache control circuit 700 sets the cache status of its CPU node to Retry.

If the entry having the status Modified is registered, the Modified data in the entry is read and the node cache status Modified and read data are transferred to the cache coherence control circuit 145 via the signal line 702.

If the block corresponding to the address "A" is registered in a status other than the status Modified, the node cache status is transferred to the cache coherence control circuit 145 via the signal line 702.

The cache coherence control circuit 145 execute the following processes in accordance with the node cache status.

(8-1) If the node cache status is the status Modified or Exclusive, the cache coherence control circuit 145 issues an RD cache coherence control request to the CPU bus interface 130 via the signal line 173.

Upon reception of the RD cache coherence control request, the CPU bus interface 130 issues an RD request transaction to the CPU bus 115 to execute the cache coherence control of CPU's of the CPU node.

CPU 110a, 110b connected to the CPU bus 115 executes the RD cache coherence control.

Specifically, CPU having the Modified block corresponding to the address "A" in the status Modified transfers the CPU cache status Modified and the Modified block to the CPU bus interface 130 via the CPU bus 115 by using a WB transaction.

CPU having the block corresponding to the address "A" in the status Exclusive or Shared changes the cache status to the status Shared and returns the cache status Shared to the CPU bus interface 130.

CPU 130 having no block at the address "A" returns the cache status Invalid to the CPU bus interface.

The CPU bus interface 130 receives the cache status, and in addition if the CPU cache status is the status Modified, together with the Modified data, from the CPU bus 115 and transfers them to the cache coherence control circuit 145 via the signal line 172.

The cache coherence control circuit 145 executes the following processes in accordance with the access right status and CPU cache status.

(8-1-1) If the node cache status is Modified and the CPU cache status is Modified, the cache status of its CPU node is set to Modified, and the data sent from the CPU interface 130 is transferred to the network interface 140 via the signal line 174.

(8-1-2) If the node cache status is Modified and the CPU cache status is a status other then the status Modified, the cache status of its CPU node is set to Modified, and the data sent from the node cache coherence control circuit 700 is transferred to the network interface 140 via the signal line 174.

(8-1-3) If the node cache status is Exclusive and the CPU cache status is Modified, the cache status of its CPU node is set to Modified, and the data sent from the CPU interface 130 is transferred to the network interface 140 via the signal line 174.

(8-1-4) If the node cache status is Exclusive and the CPU cache status is a status other than the status Modified, the cache status of its CPU node is set to Shared.

(8-2) If the node cache status is the status Shared or Invalid, the cache status of its CPU node is set to Invalid.

(8-3) If the block corresponding to the address "A" is not registered, the cache status of its CPU node is set to Invalid.

The process (9) becomes different between (the reception of an RI cache coherence control and extended block storing status check process) and (the reception of an RI cache coherence control), as in the following.

(Reception of an RI cache coherence control and extended block storing status check process)

(9) Extended Block Storing Status Check at Other CPU Nodes

The cache coherence control circuit 145 sends an extended block storing status check request to the node cache control circuit 700 via the signal line 703 to make the circuit 700 check whether each block other than the block corresponding to the address "A" in the extended block corresponding to the address "A" is registered in the node cache of its CPU node.

The node cache coherence control circuit 700 performs the extended block storing status check by the following procedure.

The node cache coherence control circuit 700 searches the node cache 701 to check whether each of blocks Bb, Bc and Bd excepting the block Ba corresponding to the address "A" in the extended block corresponding to the address "A" is registered in a status other than the status Invalid.

If there is even one block among the blocks Bb, Bc and Bd is registered in the node cache 701 in a status other than the status Invalid, the node cache coherence control circuit 700 judges that the extended block is stored in its CPU node and returns a storing status "1" to the cache coherence control circuit 145 via the signal line 702.

If all of the blocks Ba, Bb, Bc and Bd are registered or not registered in the status Invalid, the node cache coherence control circuit 700 judges that the extended block is not stored in its CPU node and returns a non-storing status "0" to the cache coherence control circuit 145 via the signal line 702.

(Reception of RI Cache Coherence Control)

(9) Extended Block Storing Status Check at Other CPU Nodes

The extended block storing status check is not performed.

(14) Update of Access Right and Node Cache

The network interface 140 of the requesting CPU node receives and processes the response transaction in accordance with the type of the issued request transaction in the following manner.

(14-1) If the request transaction is an access transaction without an RI cache coherence control, the network interface 140 of the transaction issuing CPU node 100*a* receives the RI access response transaction and transfers the transaction data 610*a*–610*d* to the CPU bus interface 130 via the signal line 171.

(14-2) If the request transaction is an access request transaction with the RI cache coherence control and extended block storing status check request, the network interface 140 of the transaction issuing CPU node 100*a* receives the RI access response transaction and the RI cache coherence control and extended block storing status check response transaction.

If the cache status is Modified, the network interface 140 transfers the data 610*a*–610*d* of the received RI cache coherence control and extended block storing status check response transaction to the CPU bus interface via the signal line 171.

If the cache status is Invalid, the data 610*a*–610*d* of the received RI access response transaction is transferred to the CPU bus interface via the signal line 171.

The network interface 140 transfers the cache status 604, storing status 606 and data 610*a*–610*d* to the cache coherence control circuit 145 via the signal line 175.

The cache coherence control circuit 145 transfers the cache status 604 to the CPU bus interface via the signal line 173.

The cache coherence control circuit 145 transfers the cache status and data sent from the network interface 140 to the node cache coherence control circuit 700 via the signal line 703, and requests the circuit 700 to register the target block in the entry Na of the node cache 701.

The node cache coherence control circuit 700 writes the data in the data field (554*a* or 554*b*) of the entry Na of the node cache 701, and writes the status Exclusive in the status field (553*a* or 553*b*) of the entry Na.

If the cache status is a status other than the status Retry, the cache coherence control circuit 145 registers the access right status of the extended block including the block corresponding to the address "A" in Wa of the access right memory 151.

In this case, if the storing status (extended block storing status check result) is a storing status, the access right status of the access right entry to be registered is set to "without an access right", whereas if the storing status is a non-storing status, the access right status of the access right entry to be registered is set to "with an access right". Then, Wa is set not in use.

The cache coherence control circuit 145 transfers the cache status 604 to the CPU bus interface via the signal line 173.

(14-3) If the request transaction is an access request transaction with the RI cache coherence control, the network interface 140 of the transaction issuing CPU node 100*a* receives the RI access response transaction and the RI cache coherence control response transaction.

If the cache status is Modified, the network interface 140 transfers the data 610*a*–610*d* of the received RI cache coherence control and extended block storing status check response transaction to the CPU bus interface via the signal line 171.

If the cache status is Invalid, the data 610*a*–610*d* of the received RI access response transaction is transferred to the CPU bus interface via the signal line 171.

The network interface 140 transfers the cache status 604, storing status 606 and data 610*a*–610*d* to the cache coherence control circuit 145 via the signal line 175.

The cache coherence control circuit 145 transfers the cache status 604 to the CPU bus interface via the signal line 173.

The cache coherence control circuit 145 transfers the cache status and data sent from the network interface 140 to the node cache coherence control circuit 700 via the signal line 703, and requests the circuit 700 to register the target block in the entry Na of the node cache 701.

The node cache coherence control circuit 700 writes the data in the data field (554*a* or 554*b*) of the entry Na of the node cache 701, and writes the status Exclusive in the status field (553*a* or 553*b*) of the entry Na.

The cache coherence control circuit 145 transfers the cache status 604 to the CPU bus interface via the signal line 173.

(Memory Write Back by CPU)

The processes (1), (2), and (4) to (6) are the same as those of the first embodiment. The process (3) is as follows.

(3) The CPU bus interface 130 for receiving the memory write-back transaction from the network interface receives the WB transaction issued at the process (1) via the CPU bus 115, and transfers the type (WB) of the transaction and a target address "A" to the cache coherence control circuit 145 via the signal line 172.

The cache coherence control circuit 145 transfers the type of the transaction and the target address "A" to the network interface 140 via the signal line 174, and makes the node cache control circuit 700 set the block status of the address "A" registered in the node cache 701 to a status Invalid.

The CPU bus interface 130 transfers the data of the WB transaction issued at the process (1) to the network interface 140 via the signal line 170.

In this embodiment, instead of the block information memory of the first embodiment, the node cache having control information substantially equivalent to that of the block information memory is used. The effects of reducing cache coherence control transactions are therefore similar to the first embodiment.

Also in this embodiment, when a block stored in the node cache is hit, the latency of reading the target block can be shortened.

However, since the node cache has the data field, the memory capacity of the CPU node control circuit increases.

<Fourth Embodiment>

The fourth embodiment is a modification of the first embodiment, and so only different points from the first embodiment will be described.

The structure of the fourth embodiment is shown in FIG. 11.

In the fourth embodiment, the block information memory 161 and block information control circuit 160 of the constituent elements of the first embodiment shown in FIG. 1 are omitted and CPU's 110a and 110b shown in FIG. 1 are replaced by CPU's 1100a and 1100b.

In the first embodiment, information of blocks stored in the internal caches 111a and 111b of CPU's 110a and 110b is registered in the block information memory 161. When an extended block storing status check request is received from other CPU's, by referring to the block information memory 161 it is judged whether the access right to the extended block can be acquired.

In contrast, in this embodiment, whether a block is stored in the internal cache 1110a, 1110b of CPU 1100a, 1100b is inquired directly to CPU 1100a, 1100b.

In order to realize this inquiry, CPU 1100a, 1100b is provided with a block status reference circuit 1101a, 1101b. The block reference circuits 1101a, 1101b are connected to the internal caches 1110a, 1110b by a signal line 1102a, 1102b and a signal line 1103a, 1103b, respectively.

Upon reception of a block status reference request from the CPU bus 115, CPU 1110a, 1110b makes the block status reference circuit 1101a, 1101b refer to the status of a target block in its internal cache 1103a, 1103b.

The block status reference circuit 1101a, 1101b checks whether the target block is registered in the internal cache 1110a, 1110b, and if registered, its status (Modified, Exclusive, Shared and Invalid) is read.

If the target block is not registered, the status is set to the Invalid status. This status is issued to the CPU bus by using a block status reference response transaction.

In the following, different points of the transaction process of this embodiment from that of the first embodiment will be described.

(Transaction Process)

(Memory Read by CPU)

The processes (1), (2), (4) to (8), (10) to (13) and (15) are the same as those of the first embodiment.

In the process (10), however, the block information control circuit 160 is replaced by the CPU bus interface 130.

The processes (3), (9) and (14) are executed in the following manner.

(3) Hit Check of Access Right Memory

The CPU bus interface 130 receives the RD transaction (1) or the cache status response and/or WB transaction (2-1) to (2-3).

The CPU bus interface 130 transfers the RD transaction and cache status response to the cache coherence control circuit 145 via the signal line 172.

Upon reception of the RD transaction, the cache coherence control circuit 145 sends a hit check request to the access right control circuit 150 via the signal line 178 to make the circuit 150 check whether the access right to the extended block (EB) including the block corresponding to the address "A" is registered in the access right memory 151.

Upon reception of the hit check request, the access right control circuit 150 reads the row (T1a) corresponding to the row address field 521 (A1a) of the address "A" from the access right memory 151.

Of the two ways of T1a, the way (Wa) having the tag 532a, 532b coincident with the tag field 522 (Ata) of the address "A" is searched.

If Wa does not exist, the way is determined to be stored in which is the access right to the extended block including the target memory read block corresponding to the address "A", and this way is used as Wa.

The method of determining the way is as follows:

If the way having the status 00b (an indefinite access right) exists, this way is used.

If the way having the status 00b does not exist, the way 1 is used if the LRU bit 531 of the row (T1a) of the access right memory 151 is "0", whereas the way 0 is used if it is "1". In this case, the status of the way to be used is set to 00b and the LRU bit 531 is inverted.

Thereafter, the access control circuit 150 sets the access right to Wa in use until the transaction is completed, and makes a transaction from its and other CPU's to be retried.

When the access right status of the target extended block is read from the access right memory 151, the access right control circuit 150 transfers the access right status to the cache coherence control circuit 145 via the signal line 179.

(Reception of an RD Cache Coherence Control and Extended Block Storing Status Check Process)

(9) Extended Block Storing Status Check at Other CPU Nodes

The cache coherence control circuit 145 sends an extended block storing status check request to the CPU bus interface 130 via the signal line 173 to make the interface 130 check whether each block in the extended block corresponding to the address "A" is registered in the node cache of its CPU node.

The CPU bus interface 130 performs the extended block storing status check by the following procedure.

In order to obtain the cache status of blocks B, C and D excepting a block "A" in the extended block corresponding to the address "A", respectively stored in the internal cache 1110a, 1110b of CPU 11001, 1100b, three block status reference request transactions corresponding to the blocks B, C and D are issued to the CPU bus 115.

Upon reception of the block reference request transactions from the CPU bus interface 130, CPU 1100a, 1100b makes the block status reference circuit 1101a, 1101b check the cache status of the block, and returns three block status reference response transactions to the CPU bus interface 130.

Upon reception of the block status reference response transactions corresponding to the blocks B, C and D, the CPU bus interface 130 transfers the status of the block "A" obtained at the process (8), and if there is a block having a status other than the status Invalid among the blocks B, C and D obtained from the three transactions, it is judged that the extended block is stored in this node, and in this case, together with the storing status, to the cache coherence control circuit 145 via the signal line 172.

If all the statuses are Invalid, it is judged that the block is not stored in the node, and a non-storing status is transferred to the cache coherence control circuit 145 via the signal line 172.

(Reception of RD Cache Coherence Control)

(9) Extended Block Storing Status Check at Other CPU Nodes

Since the request is the RD cache coherence control, the extended block storing status check is not performed.

(14) Update of Access Right

The network interface 140 of the requesting CPU node receives and processes the response transaction in accordance with the type of the issued request transaction in the following manner.

(14-1) If the request transaction is an access transaction without an RD cache coherence control, the network interface 140 of the transaction issuing CPU node 100*a* receives the RD access response transaction and transfers the transaction data 610*a*–610*d* to the CPU bus interface 130 via the signal line 171.

(14–2) If the request transaction is an access request transaction with the RD cache coherence control and extended block storing status check request, the network interface 140 of the transaction issuing CPU node 100*a* receives the RD access response transaction and the RD cache coherence control and extended block storing status check response transaction.

The network interface 140 transfers the cache status 604 and storing status 606 to the cache coherence control circuit 145 via the signal line 175.

The cache coherence control circuit 145 transfers the cache status 604 to the CPU bus interface via the signal line 173.

If the cache status is a status other than the status Retry, the cache coherence control circuit 145 registers the access right status of the extended block including the block corresponding to the address "A" in Wa of the access right memory 151.

In this case, if the storing status (extended block storing status check result) is a storing status, the access right status of the access right entry to be registered is set to "without an access right", whereas if the storing status is a non-storing status, the access right status of the access right entry to be registered is set to "with an access right". Then, Wa is set not in use.

If the cache status is a status Modified, the network interface 140 transfers the data 610*a*–610*d* of the received RD cache coherence control and extended block storing status check response transaction to the CPU bus interface via the signal line 171.

If the cache status is a status other than the status Modified, the network interface 140 transfers the data 610*a*–610*d* of the received RD access response transaction to the CPU bus interface via the signal line 171.

(14-3) If the request transaction is an access request transaction with the RD cache coherence control, the network interface 140 of the transaction issuing CPU node 100*a* receives the RD access response transaction and the RD cache coherence control response transaction.

The network interface 140 transfers the cache status 604 and storing status to the cache coherence control circuit 145 via the signal line 175. The cache coherence control circuit 145 transfers the cache status 604 to the CPU bus interface via the signal line 173.

If the cache status is a status Modified, the network interface 140 transfers the data 610*a*–610*d* of the received RD cache coherence control response transaction to the CPU bus interface via the signal line 171.

If the cache status is a status other than the status Modified, the network interface 140 transfers the data 610*a*–610*d* of the received RD access response transaction to the CPU bus interface via the signal line 171.

(Memory Read & Invalidate by CPU)

The processes (1), (2), (4) to (8), (10) to (13), and (15) are the same as those of the first embodiment.

However, CPU's 110*a* and 110*b* are replaced by CPU's 1100*a* and 1100*b*, and the block information control circuit 160 at the process (10) is replaced by the CPU bus interface 130.

The processes (3), (9) and (14) are as follows.

(3) Hit Check of Access Right Memory

The CPU bus interface 130 receives the RD transaction (1) or the cache status response and/or WB transaction (2-1) to (2-3).

The CPU bus interface 130 transfers the RI transaction and cache status response to the cache coherence control circuit 145 via the signal line 172.

Upon reception of the RI transaction (1), the cache coherence control circuit 145 sends a hit check request to the access right control circuit 150 via the signal line 178 to make the circuit 150 check whether the access right to the extended block (EB) including the block corresponding to the address "A" is registered in the access right memory 151.

Upon reception of the hit check request, the access right control circuit 150 reads the row (T1*a*) corresponding to the row address field 521 (A1*a*) of the address "A" from the access right memory 151.

Of the two ways of T1*a*, the way (Wa) having the tag 532*a*, 532*b* coincident with the tag field 522 (Ata) of the address "A" is searched.

If Wa does not exist, the way is determined to be stored in which is the access right to the extended block including the target memory read block corresponding to the address "A", and this way is used as Wa.

The method of determining the way is as follows:

If the way having the status 00b (an indefinite access right) exists, this way is used.

If the way having the status 00b (an indefinite access right) does not exist, the way 1 is used if the LRU bit 531 of the row (T1*a*) of the access right memory 151 is "0", whereas the way 0 is used if it is "1".

In this case, the status of the way to be used is set to 00b and the LRU bit 531 is inverted.

Thereafter, the access control circuit 150 sets the access right to Wa in use until the transaction is completed, and makes a transaction from its and other CPU nodes to be retried.

When the access right status of the target extended block is read from the access right memory 151, the access right control circuit 150 transfers the access right status to the cache coherence control circuit 145 via the signal line 179.

(Reception of an RI Cache Coherence Control and Extended Block Storing Status Check Process)

(9) Extended Block Storing Status Check at Other CPU Nodes

The cache coherence control circuit 145 sends an extended block storing status check request to the CPU bus interface 130 via the signal line 173 to make the interface 130 check whether each block in the extended block corresponding to the address "A" is registered in the node cache of its CPU node.

The CPU bus interface 130 performs the extended block storing status check by the following procedure.

In order to obtain the cache status of blocks B, C and D excepting a block "A" in the extended block corresponding to the address "A", respectively stored in the internal cache 1110*a*, 1110*b* of CPU 11001, 1100*b*, three block status reference request transactions corresponding to the blocks B, C and D are issued to the CPU bus 115.

Upon reception of the block reference request transactions from the CPU bus interface 130, as described previously CPU 1100*a*, 1100*b* makes the block status reference circuit 1101*a*, 1101*b* check the cache status of the block, and returns three block status reference response transactions to the CPU bus interface 130.

Upon reception of the block status reference response transactions corresponding to the blocks B, C and D, the CPU bus interface 130 transfers the status of the block "A" obtained at the process (8), and if there is a block having a status other than the status Invalid among the blocks B, C and D obtained from the three transactions, it is judged that the extended block is stored in this node, in this case, together with the storing status, to the cache coherence control circuit 145 via the signal line 172.

If all the statuses are Invalid, it is judged that the block is not stored in the node, and a non-storing status is transferred to the cache coherence control circuit 145 via the signal line 172.

(Reception of RI Cache Coherence Control)

(9) Extended Block Storing Status Check at Other CPU Nodes

Since the request is the RI cache coherence control, the extended block storing status check is not performed.

(14) Update of Access Right

The network interface 140 of the requesting CPU node receives and processes the response transaction in accordance with the type of the issued request transaction in the following manner.

(14-1) If the request transaction is an access transaction without an RI cache coherence control, the network interface 140 of the transaction issuing CPU node 100a receives the RI access response transaction and transfers the transaction data 610a–610d to the CPU bus interface 130 via the signal line 171.

(14-2) If the request transaction is an access request transaction with the RI cache coherence control and extended block storing status check request, the network interface 140 of the transaction issuing CPU node 100a receives the RI access response transaction and the RI cache coherence control and extended block storing status check response transaction.

The network interface 140 transfers the cache status 604 and storing status 606 to the cache coherence control circuit 145 via the signal line 175.

The cache coherence control circuit 145 transfers the cache status 604 to the cache control circuit 145 via the signal line 173.

If the cache status is a status other than the status Retry, the cache coherence control circuit 145 registers the access right status of the extended block including the block corresponding to the address "A" in Wa of the access right memory 151.

In this case, if the storing status (extended block storing status check result) is a storing status, the access right status of the access right entry to be registered is set to "without an access right", whereas if the storing status is a non-storing status, the access right status of the access right entry to be registered is set to "with an access right". Then, Wa is set not in use.

If the cache status is a status Modified, the network interface 140 transfers the data 610a–610d of the received RI cache coherence control and extended block storing status check response transaction to the CPU bus interface via the signal line 171.

If the cache status is a status other than the status Modified, the network interface 140 transfers the data 610a–610d of the received RI access response transaction to the CPU bus interface via the signal line 171.

(14-3) If the request transaction is an access request transaction with the RI cache coherence control, the network interface 140 of the transaction issuing CPU node 100a receives the RI access response transaction and the RI cache coherence control response transaction.

The network interface 140 transfers the cache status 604 and storing status to the cache coherence control circuit 145 via the signal line 175.

The cache coherence control circuit 145 transfers the cache status 604 to the CPU bus interface via the signal line 173.

If the cache status is a status Modified, the network interface 140 transfers the data 610a–610d of the received RI cache coherence control response transaction to the CPU bus interface via the signal line 171.

If the cache status is a status other than the status Modified, the network interface 140 transfers the data 610a–610d of the received RI access response transaction to the CPU bus interface via the signal line 171.

(Memory Write Back by CPU)

The processes (1), (2), (4) to (6) are the same as those of the first embodiment.

However, CPU's 110a, 110b, 111a and 111b are replaced by CPU's 1100a, 1100b, 1110a and 1110b.

The process (3) is as follows.

(3) Reception of Memory Write-back Transaction from Network Interface

The CPU bus interface 130 receives the WB transaction (1) from the CPU bus 115 and transfers the type (WB) of the transaction and a target address "A" to the cache coherence control circuit 145 via the signal line 172.

The cache coherence control circuit 145 transfers the type of the transaction and target address "A" to the network interface 140 via the signal line 174.

The CPU bus interface 130 transfers the data of the WB transaction (1) to the network interface 140 via the signal line 170.

In this embodiment, since the block information memory is not used, the memory capacity of the CPU node control circuit can be reduced more than the first to third embodiments.

The effects of reducing cache coherence control transactions are similar to the first embodiment.

However, since a transaction is issued to the CPU bus 115 to the extended block storing status check, the load of the CPU bus increases.

In the first to fourth embodiments, although each entry of the access right memory has three statuses: "with an access right", "without an access right"; and "an indefinite access right", each entry may have two statuses: "without an access right" and "an indefinite access right".

In this case, each of the statuses 533a and 533b of the access right memory 151 shown in FIGS. 1, 10 and 11 and each of the statuses 543a and 543b of the access right memory 1510 shown in FIG. 7 have one bit, "1" indicating "with an access right" and "0" indicating "an indefinite access right". The description is omitted for the case of "without an access right" in the CPU memory read transaction process and the CPU memory read & invalidate transaction process.

However, "without an access right" in the description of the access right memory status update process at a request reception node in the process (10) is changed to "an indefinite access right".

Also, "without an access right" in the description of the access right memory status update process at a request issuing node in the process (14) is changed to "an indefinite access right".

What is claimed is:

1. A cache coherence control system for caches which store, in the unit of a predetermined block, data of a shared memory accessed by a CPU or an I/O device provided at each of a plurality of nodes interconnected by a mutual interconnection network, wherein:

in the cache coherence control system, each node has an access right memory for registering an access right entry representative of that the node has an access right to an extended block corresponding to a plurality of blocks of the shared memory;

when the CPU or I/O device issues a shared memory access with cache coherence control to perform cache coherence control for caches of other nodes, an access right status of the extended block including a target block for the shared memory access is determined, and the determined access right status of the extended block is stored in the access right memory of the node;

if the CPU or I/O device issues the shared memory access with cache coherence control and the node including the CPU or I/O device has an access right to the extended block including the target block for the shared memory access, then the target block of the shared memory is accessed without cache coherence control at other nodes; and if the node does not have the access right to the extended block, the cache coherence control at other nodes is performed, and when necessary, the target block of the shared memory is accessed.

2. A cache coherence control system according to claim 1, wherein:

the access right memory uses a portion of an address of the extended block of the shared memory as an access right row address, and a portion other than the access right row address of the extended block address as an access right entry tag; and the access right entry tag and one or more of the access right entries for storing the access right status are stored in the access right memory at a same access right row address.

3. A cache coherence control system according to claim 2, wherein:

in searching the access right memory, the access right memory is read by using the access right row address obtained from the address of the extended block of the shared memory; and an access right status of an access right entry among a plurality of access right entries stored in the access right memory at an address shown by the access row address, the access right entry having an access right entry tag coincident with the access right entry tag obtained from the extended block address, is used as the access right status of the node.

4. A cache coherence control system according to claim 1, wherein the access right status includes three statuses: a status with an access right; a status without an access right; and a status with an indefinite access right.

5. A cache coherence control system according to claim 4, wherein:

when the CPU or I/O device issues the shared memory access with cache coherence control;

the node of the CPU or I/O device searches the access right memory of the node;

if the access right entry corresponding to the extended block including the target block for the shared memory access does not exist in the access right memory of the node, or if the access right entry corresponding to the extended block exists in the access right memory of the node and the access right status in the access right entry is the status with an indefinite access right;

cache coherence control is performed for caches in all other nodes relative to the target block for the shared memory access;

an extended block storing status check is performed to check whether one or more blocks in the extended block are stored in the cache of each of the other nodes;

if the access right entry corresponding to the extended block exists in the access right memory of the node and the access right status in the access right entry is the status without an access right, cache coherence control is performed for the cache of each of the other nodes relative to the target block; and if the access right entry corresponding to the extended block exists in the access right memory of the node and the access right status in the access right entry is the status with an access right, cache coherence control is not performed for the cache of each of the other nodes.

6. A cache coherence control system according to claim 5, wherein:

when a shared memory access with a cache coherence control and extended block storing status check request is received from another node;

cache coherence control is performed for the cache of the node relative to the target block for the shared memory access;

it is checked whether each block in the extended block including the target block is stored in the cache of the node, if one or more of the blocks in the extended block are stored in the cache, it is judged that the extended block is stored in the node, whereas if none of the blocks are stored, it is judged that the extended block is not stored in the node; and the access right memory of the node is searched, and if the access right entry corresponding to the extended block exists in the access right memory and the access right status in the access right entry is the status with an access right, the access right status is changed to the status without an access right.

7. A cache coherence control system according to claim 5, wherein:

when a shared memory access with a cache coherence control and extended block storing status check request is received from another node;

cache coherence control is performed for the cache of the node relative to the target block for the shared memory access;

it is checked whether each block in the extended block including the target block is stored in the cache of the node, if one or more of the blocks in the extended block are stored in the cache, it is judged that the extended block is stored in the node, whereas if none of the blocks are stored, it is judged that the extended block is not stored in the node; and the access right memory of the node is searched, and if the access right entry corresponding to the extended block exists in the access right memory and the access right status in the access right entry is the status with an access right, the access right status is changed to the status without an access right if the extended block is stored in the node, whereas the access right status is changed to the status with an indefinite access right if the extended block is not stored in the node.

8. A cache coherence control system according to claim 5, wherein:

when a shared memory access with a cache coherence control and extended block storing status check request is received from another node;

cache coherence control is performed for the cache of the node relative to the target block for the shared memory access;

it is checked whether each block in the extended block including the target block is stored in the cache of the node, if one or more of the blocks in the extended block are stored in the cache, it is judged that the extended block is stored in the node, whereas if none of the blocks are stored, it is judged that the extended block is not stored in the node; and the access right memory of the node is searched, and if the access right entry corresponding to the extended block exists in the access right memory and the access right status in the access right entry is the status without an access right, the access right status is changed to the status with an indefinite access right if the extended block is not stored in the node.

9. A cache coherence control system according to claim 5, wherein:

when a shared memory access with a cache coherence control request is received from another node, cache coherence control is performed for the cache of the node relative to the target block for the shared memory access.

10. A cache coherence control system according to claim 5, wherein:

when the CPU or I/O device issues the shared memory access with cache coherence control, and a cache coherence control and extended block storing status check request is issued to all other nodes, if all other nodes do not store the extended block including the target block for the shared memory access, the access right to the extended block of the node is registered in the access right memory of the node as the status with an access right.

11. A cache coherence control system according to claim 5, wherein:

when the CPU or I/O device issues the shared memory access with cache coherence control, and a cache coherence control and extended block storing status check request is issued to all other nodes, if one or more other nodes store the extended block including the target block for the shared memory access, the access right to the extended block of the node is registered in said access right memory of the node as the status without an access right.

12. A cache coherence control system according to claim 1, wherein the access right status includes two statuses: a status with an access right; and a status with an indefinite access right.

13. A cache coherence control system according to claim 12, wherein:

when the CPU or I/O device issues the shared memory access with cache coherence control;

the node of the CPU or I/O device searches the access right memory of the node;

if the access right entry corresponding to the extended block including the target block for the shared memory access does not exist in the access right memory of the node, or if the access right entry corresponding to the extended block exists in the access right memory of the node and the access right status in the access right entry is the status with an indefinite access right;

cache coherence control is performed for caches in all other nodes relative to the target block for the shared memory access;

an extended block storing status check is performed to check whether each block in the extended block is stored in the cache of each of the other nodes; and if the access right entry corresponding to the extended block exists in the access right memory of the node and the access right status in the access right entry is the status with an access right, cache coherence control is not performed for the cache of each of the other nodes.

14. A cache coherence control system according to claim 13, wherein:

when a shared memory access with a cache coherence control and extended block storing status check request is received from another node;

cache coherence control is performed for the cache of the node relative to the target block for the shared memory access;

it is checked whether each block in the extended block is stored in the cache of the node, if one or more of the blocks in the extended block are stored in the cache, it is judged that the extended block is stored in the node, whereas if none of the blocks are stored, it is judged that the extended block is not stored in the node; and the access right memory of the node is searched, and if the access right entry corresponding to the extended block exists in the access right memory and the access right status in the access right entry is the status with an access right, the access right status is changed to the status with an indefinite access right.

15. A cache coherence control system according to claim 13, wherein:

when the CPU or I/O device issues the shared memory access with cache coherence control, and a cache coherence control and extended block storing status check request is issued to all other nodes, if all other nodes do not store the extended block including the target block for the shared memory access, the access right to the extended block of the node is registered in the access right memory of the node as the status with an access right.

16. A cache coherence control system according to claim 1, wherein:

each node has a block information memory for registering an address of a block stored in the cache of the CPU or I/O device upon issuance of the shared memory access with cache coherence control by the CPU or I/O device; and upon performance of the shared memory access with cache coherence control by the CPU or I/O device, the address of the target block for the shared memory access is registered in the block information memory of the node of the CPU or I/O device.

17. A cache coherence control system according to claim 16, wherein:

the block information memory uses a portion of an address of the block of the shared memory as a row address, and a portion other than the row address of the block address of the shared memory as an entry tag, the entry tag and one or more of the entries for storing the entry status are stored in the block information memory at a same row address, and the entry status include two statuses, valid and invalid; and when the CPU or I/O device issues the shared memory access with cache coherence control, an entry corresponding to the target block for the shared memory access is registered in the block information memory of the node of the CPU or I/O device, and the status of the entry is made valid.

18. A cache coherence control system according to claim 17, wherein:
when the shared memory access with cache coherence control is received from another node;
cache coherence control is performed for the cache of the node relative to the target block for the shared memory access;
if the shared memory access is a write or a read with invalidation, the block information memory of the node is searched, and if an entry corresponding to the target block for the shared memory access is registered in the block information memory and the status of the entry is valid, the status of the entry is changed to invalid;
when a shared memory access with a cache coherence control and extended block storing status check request is received from another node;
cache coherence control is performed for the cache of the node relative to the target block; and
if the shared memory access is a write or a read with invalidation, the block information memory of the node is searched, and if an entry corresponding to the target block is registered in the block information memory and the status of the entry is valid, the status of the entry is changed to invalid and an extended block status check is performed.

19. A cache coherence control system according to claim 17, wherein:
when an entry of the block information memory is replaced by another new entry, a block corresponding to the entry is removed from the cache in the node including the block information memory.

20. A cache coherence control system according to claim 17, wherein:
when the CPU or I/O device writes back a block in the cache of the CPU or I/O device into the shared memory, the status of the entry corresponding to a target write-back block of the block information memory of the node including the CPU or I/O device is set to invalid.

21. A cache coherence control system according to claim 16, wherein:
as an extended block storing status check when a shared memory access with a cache coherence control and extended block storing status check request is received from another node,
it is checked whether an address of each block in the extended block including the target block for the shared memory access is registered in the block information memory of the node, and if even one address is registered, it is judged that the extended block is stored in the node, whereas if no address is registered, it is judged that the extended block is not stored in the node.

22. A cache coherence control system according to claim 1, wherein:
a block status of each block in the extended block is registered in access right entries, corresponding in number to the number of blocks in the extended block, of the access right memory of each node;
the block status of the entry includes two statuses, valid and invalid;
for the shared memory access with cache coherence control by the CPU or I/O device, the node of the CPU or I/O device searches the access right memory of the node;
if the access right entry corresponding to the extended block including the target block for the shared memory access is registered in the access right memory, the block status corresponding to the target block in the access right entry is changed to valid; and
if the access right entry corresponding to the extended block is not registered in the access right memory, the access right entry corresponding to the extended block is registered in the access right memory, the access right status in the access right entry is set to the status with an indefinite access right, the block status corresponding to the target block in the access right entry is set to valid, and the block statuses corresponding to the blocks other than the target block in the extended block are all set to invalid.

23. A cache coherence control system according to claim 22, wherein:
when the shared memory access with cache coherence control is received from another node;
cache coherence control is performed for the cache of the node relative to the target block for the shared memory access;
if the shared memory access is a write or a read with invalidation, the access right memory of the node is searched, and if an access right entry corresponding to the target block for the shared memory access is registered in the access right memory and the access right status of the entry is valid, the status of the access right entry is changed to invalid;
when a shared memory access with a cache coherence control and extended block storing status check request is received from another node;
cache coherence control is performed for the cache of the node relative to the target block for the shared memory access; and
if the shared memory access is a write or a read with invalidation, the access right memory of the node is searched, and if an access right entry corresponding to the target block including the target block for the shared memory access is registered in the access right memory and the access right status of the access right entry is valid, the access right status is changed to invalid and an extended block status check is performed.

24. A cache coherence control system according to claim 22, wherein:
when an entry of the access right memory is replaced by another new entry, a block whose block state in the replace target access right entry is valid is removed from the cache of the node including the access right memory.

25. A cache coherence control system according to claim 22, wherein:
when the CPU or I/O device writes back a block in the cache of the CPU or I/O device into a main memory, the block status of the replace target block in the access right entry corresponding to the extended block including the target write-back block of the node including the CPU or I/O device is set to invalid.

26. A cache coherence control system according to claim 22, wherein:
as an extended block storing status check when a shared memory access with a cache coherence control and extended block storing status check request is received from another node;

if the access right entry corresponding to the extended block including the target block for the shared memory access is registered in the access right memory;

and if one or more of the block statuses of the access right entries are valid, it is judged that the extended block is stored in the node; and if the access right entry corresponding to the extended block is not registered in the access right memory of the node, or if the access right entries are registered and all the block statuses of the access right entries are invalid, it is judged that the extended block is not stored in the node.

27. A cache coherence control system according to claim 1, wherein:

when a shared memory access with a cache coherence control and extended block storing status check request is received from another node;

cache coherence control is performed for the cache of the node relative to the target block for the shared memory access;

a request for acquiring the status of each block in the extended block including the target block for the shared memory access is issued to the cache of the node;

if all of the blocks in the extended block are not registered in the cache of the node, or if the blocks are registered and the statuses thereof are invalid, it is judged that the extended block is not stored in the node; and if one or more blocks in the extended block are registered in the cache of the node and the statuses thereof are not invalid, it is judged that the extended block is stored in the node.

* * * * *